(12) United States Patent
Ikuta et al.

(10) Patent No.: US 6,499,317 B1
(45) Date of Patent: Dec. 31, 2002

(54) SYNTHETIC QUARTZ GLASS AND METHOD FOR PRODUCTION THEREOF

(75) Inventors: Yoshiaki Ikuta, Yokohama (JP); Shinya Kikugawa, Yokohama (JP); Noriaki Shimodaira, Yokohama (JP); Akio Masui, Tokyo (JP); Shuhei Yoshizawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/581,263

(22) PCT Filed: Oct. 28, 1999

(86) PCT No.: PCT/JP99/05995

§ 371 (c)(1),
(2), (4) Date: Oct. 17, 2000

(87) PCT Pub. No.: WO00/24685

PCT Pub. Date: May 4, 2000

(30) Foreign Application Priority Data

| Oct. 28, 1998 | (JP) | 10-307476 |
| Nov. 30, 1998 | (JP) | 10-338636 |
| Dec. 9, 1998 | (JP) | 10-350116 |
| Dec. 11, 1998 | (JP) | 10-353339 |
| Dec. 11, 1998 | (JP) | 10-353351 |
| Dec. 24, 1998 | (JP) | 10-367671 |
| Dec. 25, 1998 | (JP) | 10-370014 |
| Mar. 31, 1999 | (JP) | 11-093613 |
| Sep. 28, 1999 | (JP) | 11-275030 |

(51) Int. Cl.$^7$ ............................................. G01N 23/00

(52) U.S. Cl. .............................. 65/378; 65/397; 65/399; 65/DIG. 16; 501/30; 501/40; 501/44; 501/57; 501/900; 501/905

(58) Field of Search .......................... 65/378, 397, 399, 65/DIG. 16; 501/30, 40, 44, 57, 900, 905

(56) References Cited

U.S. PATENT DOCUMENTS

| 5,326,729 A | 7/1994 | Yaba et al. |
| 5,330,941 A | 7/1994 | Yaba et al. |
| 5,958,809 A | * 9/1999 | Fujiwara et al. |

FOREIGN PATENT DOCUMENTS

| EP | 629587 | * 12/1994 | ................. 65/397 |
| EP | 691312 | * 1/1996 | |
| JP | 03-008743 | 1/1991 | |
| JP | 10-067526 | 3/1998 | |
| JP | 11-305419 | 11/1999 | |

* cited by examiner

*Primary Examiner*—Michael Colaianni
(74) *Attorney, Agent, or Firm*—Oblon, Spivak, McClelland, Maier & Neustadt, P.C.

(57) ABSTRACT

A synthetic quartz glass for optical use, to be used by irradiation with light within a range of from the ultraviolet region to the vacuum ultraviolet region, which contains fluorine, which has a ratio of the scattering peak intensity of 2250 cm$^{-1}$ ($I_{2250}$) to the scattering peak intensity of 800 cm$^{-1}$ ($I_{800}$), i.e. $I_{2250}/I_{800}$, of at most $1\times10^{-4}$ in the laser Raman spectrum, and which has an absorption coefficient of light of 245 nm of at most $2\times10^{-3 cm^{-1}}$.

20 Claims, No Drawings

SYNTHETIC QUARTZ GLASS AND METHOD FOR PRODUCTION THEREOF

BACKGROUND OF THE INVENTION

1. Technical Field

The present invention relates to a synthetic quartz glass to be used for optical components for an apparatus employing ultraviolet lights having wavelengths of at most 400 nm as a light source, and a process for producing it. More specifically, the present invention relates to a synthetic quartz glass to be used as optical components (including products and semifinished products) such as a lens (projection type or illumination type), a prism, an etalon, a photomask, a pericle (pericle material, pericle flame or both) and a material for windows, to be used for light within a range of from the ultraviolet region to the vacuum ultraviolet region emitted from a light source such as an excimer laser (XeCl:308 nm, KrF:248 nm, Arf:193 nm), a $F_2$ laser (157 nm), a low pressure mercury lamp (185 nm), a $Xe_2^*$ excimer lamp (172 nm) or a deuterium lamp (110–400 nm); and a process for producing it.

2. Background Art

A synthetic quartz glass has such characteristics that it is a transparent material within a wavelength range of as wide as from the near infrared region to the ultraviolet region, it has an extremely small thermal expansion coefficient and is excellent in dimensional stability, and it contains substantially no metal impurity and has a high purity. Accordingly, a synthetic quartz glass has been mainly used for optical components of a conventional optical apparatus employing g-line (436 nm) or i-line (365 nm) as a light source.

Along with high-integration of LSI in recent years, techniques to draw finer and thinner lines has been required in an optical lithography technology to draw an integration circuit pattern on a wafer, and accordingly use of light having a shorter wavelength as an exposure light source has been promoted. For example, for a light source of a stepper for lithography, a KrF excimer laser or an ArF excimer laser became used, instead of the conventional g-line and I-line, and further a $F_2$ laser becomes used.

Further, the low pressure mercury lamp, the $Xe_2^*$ excimer lamp and the deuterium lamp are used for 1) an apparatus such as a photochemical CVS, 2) an etching apparatus or an ashing for silicon wafer, or 3) an ozonizer, and the development thereof has been made for the future application to optical lithography technology. It is necessary to use a synthetic quartz glass also for optical components to be used by irradiation with light having a short wavelength, such as a gas filling tube to be used for the low pressure mercury lamp, the excimer lamp or the deuterium lamp, or an optical apparatus employing the above-mentioned short wavelength light source.

For the synthetic quartz glass to be used for such optical components, not only optical transmittance of light having a wavelength of from the ultraviolet region to the vacuum ultraviolet region, is required, but also it is required that the transmittance does not decrease due to irradiation with ultraviolet lights (hereinafter referred to simply as durability to ultraviolet light). Further, the optical components to be used by irradiation with light from e.g. the ArF excimer laser, the $F_2$ laser, the low pressure mercury lamp, the $Xe_2^*$ excimer lamp or the deuterium lamp, are required to be excellent in optical transmittance of light having a wavelength in the vacuum ultraviolet region of at most 200 nm (hereinafter referred to simply as vacuum ultraviolet lights optical transmittance). Further, optical components to be used for light having a wavelength of at most 200 nm, are required to have a smaller refractive index variation range ($\Delta n$) as compared with a conventional one (hereinafter referred to as uniformity).

If the conventional synthetic quartz glass is irradiated with light having a high energy emitted from a light source such as the KrF excimer laser or the ArF excimer laser, a new absorption band will be formed on the ultraviolet region, and it has problems as an optical component to organize an optical system employing ultraviolet lays as a light source. Namely, when irradiated with ultraviolet lights for a long period of time, an absorption band of abbreviation 215 nm which is so-called E' center ($\equiv$Si.) and an absorption band of abbreviation 260 nm which is called NBOHC (non-bridging oxygen hole center: $\equiv$Si-O.) will be formed.

The causes of such absorption band formation can be roughly classified into two groups. One cause is a structural defect of the synthetic quartz glass, i.e. an oxygen deficient defect such as $\equiv$Si–Si$\equiv$ and $\equiv$Si–H, or an oxidation type defect such as $\equiv$Si–O–O–Si$\equiv$, and the other cause is an unstable structure in the synthetic quartz glass, i.e. a three-membered cyclic structure or a four-membered cyclic structure. It is considered that such defects are cut by irradiation with ultraviolet lights, as shown in the following formulae (1) to (4), to form paramagnetic defects (E' center and NBOHC), and the paramagnetic defects will cause decrease in transmittance, decrease in durability to ultraviolet light, increase in absolute refractive index, variation in refractive index distribution, and fluorescence:

  (1)

  (2)

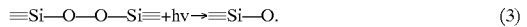  (3)

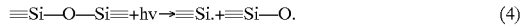  (4)

Various methods have been studied to overcome these problems, and it has been known to have hydrogen molecules contained in the synthetic quartz glass in some way. For example, JP-A-3-88742 discloses a method to suppress the decrease in transmittance due to irradiation with ultraviolet lights, by having hydrogen molecules and OH groups contained in the synthetic quartz glass, in an amount of at least $5 \times 10^{16}$ molecules/cm$^3$ and in an amount of at least 100 ppm, respectively.

However, the OH groups in the synthetic quartz glass may cause a problem since the reaction of the following formula (5) will proceed due to irradiation with ultraviolet lights to form NBOHC, whereby 260 nm absorption and 650 nm fluorescence will be formed:

  (5)

Even if the hydrogen molecules are contained, the reaction of the formula (5) can not completely be prevented, and particularly when the OH group concentration is high, the 650 nm fluorescence will be more intense, such being problematic. Further, if the OH group concentration is high, the transmittance of light within a range of from 150 to 180 nm will decrease, such being problematic when the synthetic quartz glass is used for an apparatus employing e.g. the low pressure mercury lamp, the $Xe_2^*$ excimer lamp or the $F_2$ laser as the light source.

To overcome such problems, JP-A-6-227827 discloses a synthetic quartz glass having an OH group concentration of at most 10 ppm and a halogen concentration of at least 440 ppm and containing hydrogen molecules. With the synthetic quartz glass, excellent durability to ultraviolet light can be obtained since the OH group concentration is low, and further a high transmittance can be obtained at a wavelength of from 150 to 180 nm.

Said JP-A-6-227827 proposes a production process comprising (1) a step of subjecting a glass forming material into flame hydrolysis to form a porous quartz glass body, (2) a step of heating the porous quartz glass body under a halogen-containing atmosphere at a temperature of from 800 to 1,250° C. for dehydration treatment. (3) a step of raising the temperature of the porous quartz glass body having dehydration treatment applied thereto, to the transparent vitrification temperature for transparent vitrification, and (4) a step of subjecting the transparent-vitrified synthetic quartz glass to a heat treatment under a hydrogen-containing atmosphere at a temperature of from 500 to 1,100° C. to have the synthetic quartz glass contain hydrogen.

Further, since the synthetic quartz glass is held in an atmosphere containing hydrogen at a high temperature, the oxygen deficient defects of $\equiv$Si–Si$\equiv$ and $\equiv$Si–H are likely to be formed, JP-A-8-75901 proposes a production process which comprises forming a transparent-vitrified fluorine-containing quartz glass in substantially the same manner as disclosed in JP-A-6-227827, and then having said quartz glass contain hydrogen in an atmosphere containing hydrogen at a temperature of at most 500° C.

However, the present inventors have studied on the processes as described in JP-A-6-227827 and JP-A-8-75901, and as a result, they have found that an adequate durability to ultraviolet light can not always be obtained. Namely, if the porous quartz glass body is treated in an atmosphere containing a fluorine compound at a high temperature of from 800 to 1,250° C., the above-mentioned $\equiv$Si–Si$\equiv$ defect will be formed. Not only this $\equiv$Si–Si$\equiv$ defect will form the E' center due to irradiation with ultraviolet lights as mentioned above, but also it has absorption bands at 245 nm and 163 nm, such being problematic.

Further, the $\equiv$Si–Si$\equiv$ defect will form $\equiv$Si–H as shown in the following formula (6), even if hydrogen-containing treatment is carried out, and the $\equiv$Si–H will form the E' center due to irradiation with ultraviolet lights, such being problematic:

$$\equiv\text{Si—Si}\equiv + H_2 \rightarrow \equiv\text{Si—H} + \equiv\text{Si–H} \qquad (6)$$

On the other hand, in order to improve vacuum ultraviolet lights optical transmittance, JP-A-8-91867 proposes a synthetic quartz glass having an OH group concentration of at most 200 ppm, a chlorine concentration of at most 2 ppm and a $\equiv$Si–Si$\equiv$ concentration of at most $1\times10^{15}$ in number per cm$^3$. JP-A-9-235134 proposes a synthetic quartz glass having an OH group concentration of from 10 to 400 ppm, and the concentration of the oxygen deficient defect and the oxidation type defect of at most $5\times10^{16}$ in number per cm$^3$, respectively. JP-A-7-267674 proposes a synthetic quartz glass having an OH group concentration of from 100 to 2,000 ppm and containing a transition metal, an alkali metal and an alkaline earth metal in amounts of at most predetermined concentrations.

With respect to such conventional synthetic quartz glass, improvement in the vacuum ultraviolet lights optical transmittance is attempted by adjusting the OH group concentration to be within a predetermined range. However, a high transmittance can not always be obtained at the vacuum ultraviolet region.

Further, as a process to secure uniformity of the synthetic quartz glass, JP-B-6-27014 proposes a process to adjust the variation ranges of the OH group and chlorine concentrations, by having OH groups and chlorine contained in the synthetic quartz glass. However, chlorine is present in the synthetic quartz glass in the form of $\equiv$Si–Cl, and the bond of $\equiv$Si–Cl has a bonding energy of as weak as from 7 to 8 eV, and it easily undergoes cleavage as shown in the following formula due to irradiation with ultraviolet lights, and the E' center will be formed also:

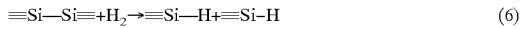

$$\equiv\text{Si—Cl} + h\nu \rightarrow \equiv\text{Si.(E' center)} + \text{Cl}.$$

Accordingly, although a synthetic quartz glass having excellent uniformity can be obtained by the above-mentioned process, there is a problem on durability to ultraviolet light.

The present invention provides a synthetic quartz glass which reduces generations of the E' center and fluorescence emission, and which is excellent in durability to ultraviolet light.

The present invention further provides a synthetic quartz glass which is excellent in vacuum ultraviolet lights optical transmittance.

The present invention further provides a synthetic quartz glass which is excellent in uniformity.

The present invention provides a suitable process for producing such synthetic quartz glass.

DISCLOSURE OF THE INVENTION

The present inventors have conducted extensive studies on the influence of the halogen concentration in the synthetic quartz glass and the influence of an unstable structure in the synthetic quartz glass, on the durability to ultraviolet light and ultraviolet lights optical transmittance. As a result, they have found that fluorine is present in the synthetic quartz glass in a form of $\equiv$Si–F, and the $\equiv$Si–F bond has a very strong bonding energy of at least 20 Ev and does not undergo cleavage due to irradiation with ultraviolet lights, and accordingly there will be no problem in the durability to ultraviolet light. Further, they have found that fluorine reduces distorted structures in the quartz glass and improves the durability to ultraviolet light, although the mechanism is not clear.

Accordingly, the present invention provides a synthetic quartz glass which contains fluorine, which has a ratio of the scattering peak intensity of 2,250 cm$^{-1}$ ($I_{2250}$) to the scattering peak intensity of 800 cm$^{-1}$ ($I_{800}$), i.e. $I_{2250}/I_{800}$, of at most $1\times10^{-4}$ in the laser Raman spectrum, and which has an absorption coefficient of light of 245 nm (hereinafter referred to simply as absorption coefficient of 245 nm) of at most $2\times10^{-3}$ cm$^{-1}$.

BEST MODE FOR CARRYING OUT THE INVENTION

The scattering peak of 800 cm$^{-1}$ is a peak indicating the bond of $\equiv$Si–O– (basic vibration between silicon and oxygen), and the scattering peak of 2,250 cm$^{-1}$ is a peak indicating the bond of $\equiv$Si–H as a oxygen deficient defect, and the value of $I_{2250}/I_{800}$ is an index of the concentration of $\equiv$Si–H defect ($\equiv$Si–H concentration). In the present invention, it is important that $I_{2250}/I_{800}$ is at most $1\times10^{-4}$. if it exceeds $1\times10^{-4}$, the E' center is likely to be formed.

The absorption coefficient of 245 nm is an index of the concentration of the $\equiv$Si–Si$\equiv$ defect which is also a oxygen deficient defect. In the present invention, it is important that the absorption coefficient of 245 nm is at most $2\times10^{-3}$ cm$^{-1}$. If it exceeds $2\times10^{-1}$, the E' center is likely to be formed also. Further, if it exceeds $2\times10^{-3}$ cm$^{-1}$, a high optical transmittance at from 150 to 180 nm will hardly be achieved. Further, it is preferred that the absorption of light of 163 nm is also reduced.

In the present invention, definition of the scattering peak of 2,250 cm$^{-1}$ and definition of the absorption coefficient of 245 nm are to define the amount of the oxygen deficient defects.

The concentration of the E' center may be evaluated by measuring the transmittance of light of 214 nm immediately after shot irradiation with KrF excimer laser light, by an ultraviolet visible spectrophotometer, to obtain the amount of change in the absorption coefficient $\Delta\kappa_{214}$ [cm$^{-1}$] before and after the irradiation. $\Delta\kappa_{214}$ is preferably at most $1\times10^{-1}$, particularly preferably at most $1\times10^{-2}$.

The degree of the fluorescence emission can be evaluated by measuring the fluorescence intensity of 650 nm ($L_{650}$) when shot-irradiated with KrF excimer laser light, and the scattering light intensity by the KrF excimer laser ($S_{248}$), from a direction perpendicular to the axis of incidence of the KrF excimer laser light, to obtain the ratio of the 650 nm fluorescence intensity to the scattering light intensity by the KrF excimer laser (248 nm), i.e. $L_{650}/S_{248}$. $L_{650}/S_{248}$ is preferably at most $5\times10^{-4}$, particularly preferably at most $1\times10^{-4}$.

The present inventors have further conducted extensive studies on the influences of the halogen concentration and the OH group concentration in the synthetic quartz glass on the durability to ultraviolet light, and as a result, they have found that in the synthetic quartz glass, fluorine and chlorine have different actions, the chlorine is present in the synthetic quartz glass in the form of $\equiv$Si–Cl, and the $\equiv$Si–Cl bond has a bonding energy of as weak as from 7 to 8 eV and easily undergoes cleavage due to irradiation with ultraviolet lights as shown in the following formula (7):

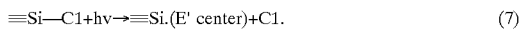

$$\equiv Si-Cl + h\nu \rightarrow \equiv Si.(E' \text{ center}) + Cl. \quad (7)$$

and accordingly the above-mentioned E' center is formed, whereby the durability to ultraviolet light will decrease.

A synthetic quartz glass containing no chlorine, produced by using a glass material containing no chlorine, has also been proposed (JP-A-7-291635). In the proposal, the fluorine concentration is brought to at least 1,000 ppm, in order to suppress the decrease in transmittance due to irradiation with high energy lights, and the OH group concentration is brought to at least 50 ppm, in order to suppress absorption at 245 nm due to the oxygen deficiency type defect $\equiv$Si–Si$\equiv$. On the other hand, the problem in decrease in transmittance at from 150 to 180 nm is not mentioned, and there is a problem when the synthetic quartz glass is used for an apparatus employing the low pressure mercury lamp, the Xe$_2$* excimer lamp or the F$_2$ laser as the light source.

Accordingly, the present inventors have considered that in order to suppress the formation of the paramagnetic defects itself to achieve essential improvements in the durability to ultraviolet light, it is required to optimize the OH group, chlorine and fluorine concentrations in the synthetic quartz glass, and they have further conducted extensive studies in this point. As a result, they have found that a synthetic quartz glass having excellent durability to ultraviolet light can be obtained even if the OH group concentration is slightly low, when the fluorine concentration is increased and the chlorine concentration is decreased in the synthetic quartz glass.

Namely, the present invention provides a synthetic quartz glass which contains fluorine so that the amount of the oxygen deficient defects is at most a specified amount, and which has a chlorine concentration of at most 100 ppm. Particularly, as a synthetic quartz glass useful to suppress the unstable structure, the E' center and the fluorescence emission in synthetic quartz and having excellent durability to ultraviolet light, a synthetic quartz glass which has an OH group concentration of less than 50 ppm, a fluorine concentration of at least 100 ppm, a chlorine concentration of at most 100 ppm, and a hydrogen molecule concentration of at least $5\times10^{16}$ molecules/cm$^3$, is preferred.

Further, the present inventors have conducted studies on mutual relation between the influences of the halogen concentration and the hydrogen molecule concentration in the synthetic quartz glass, and the influence of the unstable structure in quartz glass. As a result, they have found that by decreasing the amount of existing unstable structures to a certain limit by fluorine doping, and by utilizing an effect to repair the paramagnetic defects by containment of the hydrogen molecules, the ultraviolet lights optical transmittance and the durability to ultraviolet light of the synthetic quartz glass to light emitted from a shorter wavelength light source, can be improved to satisfactory levels.

Accordingly, they have found that among the synthetic quartz glass of the present invention, a synthetic quartz glass having intensity ratios of the scattering peak intensity of 495 cm$^{-1}$ ($I_1$) and the scattering peak intensity of 606 cm$^{-1}$ ($I_2$), attributable to the unstable structures in quartz glass, to the scattering peak intensity of 440 cm$^{-1}$ ($I_0$) in the laser Raman spectrum, i.e. $I_1/I_0$ and $I_2/I_0$, respectively within specified ranges, is effective for improvements in the ultraviolet lights optical transmittance and the durability to ultraviolet light.

Accordingly, on the basis of the above-mentioned discoveries, the present invention provides a synthetic quartz glass which contains fluorine, which has the oxygen deficient defects in at most specified amount, and which has such ratios of the scattering peak intensity of 495 cm$^{-1}$ ($I_1$) and the scattering peak intensity of 606 cm$^{-1}$ ($I_2$) to the scattering peak intensity of 440 cm$^{-1}$ ($I_0$) that $I_1/I_0 \leq 0.585$ and $I_2/I_0 \leq 0.136$, respectively, in the laser Raman spectrum. Particularly preferably fluorine is contained in an amount of at least 100 ppm, and the hydrogen molecules are contained in an amount of at least $5\times10^{16}$ molecules/cm$^3$.

The synthetic quartz glass of the present invention has a fluorine concentration of preferably at least 100 ppm (wt. ppm, the same applies hereinafter, and the same applies to ppb). If it is less than 100 ppm, no adequate effect to reduce the unstable structures in the synthetic quartz glass may be obtained in some cases. The fluorine concentration is more preferably at least 400 ppm, particularly preferably within a range of from 400 to 3,000 ppm. If the fluorine concentration exceeds 3,000 ppm, the oxygen deficient defects may be formed, whereby the durability to ultraviolet light may decrease.

The synthetic quartz glass of the present invention has an OH group concentration of preferably at most 100 ppm. If it exceeds 100 ppm, transmittance at a wavelength region of at most abbreviation 170 nm will decrease, and there is a possibility that the synthetic quartz glass may not be suitable as optical components for an apparatus employing e.g. the Xe$_2$* excimer lamp, the F$_2$ laser or the deuterium lamp as the light source. When the OH group concentration is at most 50 ppm, good durability to ultraviolet light can be obtained, and from the viewpoint that a high transmittance can be obtained at the vacuum ultraviolet region, it is preferably at most 20 ppm, more preferably less than 10 ppm. Particularly, the OH group concentration will be an influence on optical transmittance of light having a wavelength of at most 200 nm in the vacuum ultraviolet region, and accordingly the OH group concentration is preferably less than 10 ppm in the synthetic quartz glass to be used for light having a wavelength of at most 175 nm in the vacuum ultraviolet region. Further, in the synthetic quartz glass to be used for light having a wavelength of at most 160 nm in the vacuum ultraviolet region, the OH group concentration is preferably at most 5 ppm.

Further, the oxygen deficiency type defect (≡Si–Si≡) in the synthetic quartz glass will be a significant influence on the vacuum ultraviolet lights optical transmittance, and this oxygen deficiency type defect has an absorption band with a wavelength of 163 nm as the center. The internal transmittance $T_{163}$ (%/cm) at a wavelength of 163 nm is estimated as represented by the following formula (a) from the OH group concentration $C_{OH}$ (ppm) in the synthetic quartz glass:

$$T_{163}(\%/cm) \geq \exp(-0.02 C_{OH}^{0.85}) \times 100 \quad (i)$$

However, the oxygen deficiency type defect has an absorption band with a wavelength of 163 nm as the center, whereby the practical transmittance ($T_{163}$) at a wavelength of 163 nm is smaller than the value of the right side of the formula (i), and further, the transmittance at a wavelength of at most 200 nm will decrease, although it depends on the intensity of the absorption band. Accordingly, in order to obtain excellent vacuum ultraviolet optical transmittance, it is important that substantially no oxygen deficiency type defect is contained, and it is preferred that substantially no oxygen deficiency type defect is contained, i.e. the formula (i) referring to the internal transmittance at a wavelength of 163 nm is satisfied.

Further, the synthetic quartz glass of the present invention has an internal transmittance of preferably 70%/cm at 157 nm, particularly preferably at least 80%/cm, in view of the vacuum ultraviolet lights optical transmittance.

In the synthetic quartz glass of the present invention, the smaller the chlorine concentration, the better. When the chlorine concentration is at most 100 ppm, good durability to ultraviolet light can be obtained, and it is preferably at most 25 ppm in view of uniformity, and it is particularly preferably at most 10 ppm from the viewpoint that good vacuum ultraviolet lights optical transmittance can be obtained. Further, in view of durability to ultraviolet light in the vacuum ultraviolet region with a wavelength of at most 175 nm, the amount of chlorine is preferably as small as possible, and specifically, it is preferably at most 100 ppb, particularly preferably at most 50 ppb.

When the synthetic quartz glass of the present invention has a hydrogen molecule concentration of at least $5 \times 10^{16}$ molecules/cm$^3$, an effect to repair the paramagnetic defects formed due to irradiation with ultraviolet lights, may be obtained. Particularly, the hydrogen molecule concentration is preferably at least $1 \times 10^{17}$ moleculers/cm$^3$, more preferably $1 \times 10^{17}$ to $5 \times 10^{18}$ molecules/cm$^3$, particularly preferably from $5 \times 10^{17}$ to $5 \times 10^{18}$ molecules/cm$^3$.

On the other hand, the Si–O–Si bond angle of the ≡Si–O–Si≡ bond in the quartz glass network has a certain distribution. The unstable structure in the synthetic quartz glass means the distorted ≡Si–O–Si≡ bond. The unstable structure in the synthetic quartz glass has a weak bonding energy as compared with the normal structure, and accordingly, the more the unstable structures, the more the vacuum ultraviolet lights optical transmittance will decrease. The unstable structure depends on the fictive temperature of the synthetic quartz glass, and is influenced by the fluorine concentration in the synthetic quartz glass. Namely, by doping the synthetic quartz glass with fluorine, the unstable structures can be reduced, and the lower the fictive temperature, the more the unstable structures will decrease. Specifically, when the fictive temperature of the synthetic quartz glass is at most 1,100° C., the unstable structures can be reduced, and excellent vacuum ultraviolet lights optical transmittance can be obtained. In such a case, the fluorine concentration is preferably at least 100 ppm. In the present invention, the fictive temperature is represented by the fictive temperature obtained in accordance with the method by A. Agarwal et al. (J. Non-Cyrst., 185, 191, 1995).

Metal impurities such as an alkali metal, an alkaline earth metal and a transition metal in the synthetic quartz glass of the present invention, not only decrease the transmittance within a range of from the ultraviolet region to the vacuum ultraviolet region, but also decrease the durability to ultraviolet light, and accordingly the concentration thereof is preferably as low as possible. Specifically, the total amount of the metal impurities is preferably at most 100 ppb, particularly preferably at most 50 ppb.

Further, since the OH groups and the fluorine in quartz glass will influence on the refractive index, distributions of the OH groups and fluorine concentrations in the synthetic quartz glass will deteriorate uniformity.

Accordingly, the present inventors have considered that it is necessary to optimize the OH group and fluorine concentration distributions, in order to suppress the formation of the paramagnetic defects itself to improve durability to ultraviolet light and to improve uniformity, and they have conducted studies on this point. As a result, they have found that uniformity can be improved when both variation ranges of the fluorine concentration and the OH group concentration are brought to be within a range of at most 15 ppm by controlling the distributions of the fluorine concentration and the OH group concentration at the region at which light is transmitted, i.e. at the light transmitting region.

Further, they have found that in a case where the OH groups and the fluorine are distributed so that they offset the concentration distribution of the other at the region at which light is transmitted, uniformity can be improved even if the upper limits of the variation ranges of the fluorine concentration and the OH group concentration are brought to be at most 25 ppm.

Accordingly, the present invention provides a synthetic quartz glass for optical use, to be used by irradiation with light within a range of from the ultraviolet region to the vacuum ultraviolet region, which comprises a synthetic quartz glass containing OH groups and fluorine and having a chlorine concentration of at most 25 ppm, wherein the variation range of the OH group concentration is at most 15 ppm and the variation range of the fluorine concentration is at most 15 ppm, at the light transmitting region.

The present invention further provides a synthetic quartz glass having excellent uniformity and durability to ultraviolet light, which comprises a synthetic quartz glass containing OH groups and fluorine and having a chlorine concentration of at most 25 ppm, wherein the OH groups and the fluorine are distributed so that they offset the concentration distribution of the other, and the variation range of the OH group concentration is at most 25 ppm and the variation range of the fluorine concentration is at most 25 ppm, at the light transmitting region.

In the present invention, a synthetic quartz glass having variation ranges of the OH group concentration and the fluorine concentration of both at most 15 ppm at the light transmitting region, is preferred since excellent uniformity can be obtained stably. Further, in a case where the OH groups and the fluorine are distributed so that they offset the concentration distribution of the other at the light transmitting region, excellent uniformity can be obtained stably, even with a synthetic quartz glass having a variation range of the OH group concentration of at most 25 ppm and a variation range of the fluorine concentration of at most 25 ppm.

In this case, the refractive index variation range ($\Delta n$) in a plane perpendicular to the incident light, is preferably at most $20 \times 10^{-6}$, particularly preferably at most $10 \times 10^{-6}$, more preferably at most $5 \times 10^{-6}$, and most preferably at most $2 \times 10^{-6}$.

In view of this $\Delta n$, the sum of the variation ranges of the fluorine concentration and the OH group concentration at the light transmitting region is particularly preferably at most 5 ppm.

In the present invention, the light transmitting region is a region at which light within a range of from the ultraviolet region to the vacuum ultraviolet region is transmitted or reflected when the synthetic quartz glass is used. Further, in the present invention, the OH groups and the fluorine being distributed so that they offset the concentration distribution of the other, represents such a distribution state that the fluorine concentration and the OH group concentration complement increase or decrease of the other in an optional plane perpendicular to the incident light. Namely, it represents such as distribution state that when the fluorine concentration increases from the center toward the periphery in an optional plane, the OH group concentration decreases from the center toward the periphery in the plane, or the reverse distribution state thereof. Specifically, as shown in graphs illustrating the distribution states of the fluorine concentration and the OH group concentration in Tables 14 to 17, with respect to the synthetic quartz glass of Examples 82 to 94 as mentioned hereinafter, the distribution state wherein in a plane perpendicular to the incident light, the fluorine concentration shows a graph of downward convex with a minimum at the center, whereas the OH group concentration shows a graph of upward convex with a maximum at the center, whereby both concentrations are complements each of the other, or the distribution state reverse thereof, may be mentioned.

In the present invention, as a process for producing the synthetic quartz glass, a direction method, a soot method (VAD method, OVD method) or a plasma method may, for example, be mentioned. The soot method is particularly preferred since the synthesizing temperature is low, and contamination of impurities such as chlorine and metals can be avoided. Further, according to the soot method, the OH groups will be substituted by fluorine by doping with fluorine. According to the soot method, the amount of doped fluorine and the amount of the OH groups substituted are substantially the same, whereby the OH groups can efficiently be reduced, and accordingly a synthetic quartz glass having a low OH group concentration and having excellent ultraviolet lights optical transmittance can be obtained with a high production efficiency.

Now, the process for producing the synthetic quartz glass of the present invention by the soot method will be explained specifically.

The process for producing the synthetic quartz glass by the soot method comprises the following steps (a), (b) and (c):

(a) a step of depositing and growing fine quartz glass particles obtained by subjecting a quartz glass forming material to flame hydrolysis, on a substrate, to form a porous quartz glass body;

(b) a step of holding the porous quartz glass body in a fluorine-containing atmosphere to obtain a porous quartz glass body containing fluorine; and (c) a step of raising the temperature of the porous quartz glass body containing fluorine to the transparent vitrification temperature for transparent vitrification to obtain a transparent quartz glass body containing fluorine.

In the case where hydrogen molecules are contained, the synthetic quartz glass is produced by carrying out the following steps (a), (b'), (c') and (d) in this order:

(a) a step of depositing and growing fine quartz glass particles obtained by subjecting a quartz glass forming material to flame hydrolysis, on a substrate, to form a porous quartz glass body;

(b') a step of holding the porous quartz glass body in a fluorine-containing atmosphere at a temperature of at most 600° C. to obtain a porous quartz glass body containing fluorine;

(c') a step of raising the temperature of the porous quartz glass body containing fluorine to a transparent vitrification temperature in an atmosphere containing substantially no fluorine, for transparent vitrification, to obtain a transparent quartz glass body containing fluorine; and (d) a step of holding the transparent quartz glass body containing fluorine in a hydrogen gas-containing atmosphere at a temperature of at most 600° C., to have the transparent quartz glass body containing fluorine contain hydrogen, to obtain a synthetic quartz glass.

If the temperature at the time of holding the porous quartz glass body in an atmosphere containing a fluorine compound is high, the $\equiv$Si—Si$\equiv$ defect is likely to be formed. Namely, if the porous quartz glass body is treated in an atmosphere containing a fluorine compound at a high temperature, the activity of the fluorine compound tends to be high, and the $\equiv$Si—Si$\equiv$ detect tends to be formed as shown in the following formulae (8) and (9):

     (8)

fluorine compound

     (9)

fluorine compound

Accordingly, when the porous quartz glass body is treated in an atmosphere containing a fluorine compound at a low temperature of at most 600° C., the activity of the fluorine compound can be suppressed, and the reaction of the above-mentioned formula (9) alone will take place without the reaction of the formula (8), and accordingly the $\equiv$Si—Si$\equiv$ defect may not be formed.

Now, each of the steps will be explained. In the step (a), a quartz glass forming material, an oxygen gas and a hydrogen gas are supplied to a multiple-tube burner for flame hydrolysis, to obtain fine quartz glass particles, which are then deposited and grown on a substrate to form a porous quartz glass body. The quartz glass forming material is not particularly limited so long as it can be gasified, and silicon halide compounds including chlorides such as $SiCl_4$, $SiHCl_3$, $SiH_2Cl_2$ and $SiCH_3Cl_3$, fluorides such as $SiF_4$, $SiHF_3$ and $SiH_2F_2$, bromides such as $SiBr_4$ and $SiHBr_3$, and iodides such as $SiI_4$, and alkoxy silanes represented by $R_nSi(OR)_{4-n}$ (wherein R is a $C_{1-4}$ alkyl group, and n is an integer of from 0 to 3), may be mentioned. Further, as the above-mentioned substrate, a seed stick made of quartz glass (e.g. seed stick as disclosed in JP-B-63-24973) may be mentioned. Further, the shape is not limited to a stick, and a plate substrate may be used. Further, with respect to the ratio of the hydrogen gas to the oxygen gas, preferred is an oxygen-excessive atmosphere since the oxygen deficient defects will be formed in a hydrogen-excessive atmosphere. Specifically, the ratio of the hydrogen gas to the oxygen gas is preferably from 1.6 to 1.9.

Then, in the step (b), the above-mentioned porous quartz glass body is held in a fluorine-containing atmosphere at a temperature of at most 600° C., to obtain a porous quartz glass body containing fluorine. As the fluorine-containing atmosphere, preferred is an inert gas atmosphere containing a fluorine-containing gas (such as $SiF_4$, $SF_6$, $CHF_3$, $CF_4$ or $F_2$) in an amount of from 0.1 to 100 vol %, particularly from 1 to 20 vol %. Preferred is a treatment in such an atmosphere at a temperature of at most 600° C. under a pressure of from 0.1 to 10 atm for from several tens minutes to several hours. Further, in the case of carrying out fluorine doping at a high temperature of from 500 to 1,000° C., it is preferred to employ an atmosphere containing oxygen in an amount of from 5 to 90% to suppress the formation of the oxygen deficient defects. In the present specification, "atm" and "Torr" as mentioned hereinafter represent not gauge pressures but absolute pressures.

Further, in the process (b), since the porous quartz glass body can uniformly be doped with fluorine in a short period of time, it is preferred to hold the porous quart glass body at a predetermined temperature of at most 1,200° C., preferably at most 600° C., under a reduced pressure (preferably at most 100 Torr, particularly preferably at most 10 Torr), and then to introduce a fluorine-containing gas thereinto until the normal pressure, to obtain the fluorine-containing atmosphere.

Then, in the step (c), the temperature of the above-mentioned porous quartz glass body containing fluorine is raised to the transparent vitrification temperature in an atmosphere containing substantially no fluorine, for transparent vitrification, to obtain a transparent quartz glass body containing fluorine. The transparent vitrification temperature is at least 1,300° C., preferably from 1,300 to 1,600° C., particularly preferably from 1,350 to 1,500° C.

The atmosphere containing substantially no fluorine is not particularly limited so long as the fluorine-containing gas (such as $SiF_4$, $SF_6$, $CHF_3$, $CF_4$ or $F_2$) is at most 0.1 vol % at the initiation of the treatment by the step (c), and it is preferably an inert gas 100% atmosphere such as helium, or an atmosphere containing an inert gas such as helium as the main component. The pressure may be reduced pressure or normal pressure. Particularly in the case of normal pressure, a helium gas may be used. Further, in the case of reduced pressure, the pressure is preferably at most 100 Torr, particularly preferably at most 10 Torr.

Further, it is preferred that a step (e) of reducing the pressure and leaving the porous quartz glass body containing fluorine under reduced pressure for a predetermined time, is carried out between the steps (b) and (c). Specifically, it is preferred to carry out a step of holding the porous quartz glass body containing fluorine at the temperature for carrying out the fluorine doping in the above-mentioned step (b) in an inert gas atmosphere under a pressure of at most 100 Torr, more preferably at most 10 Torr, for several tens minutes to several hours. It is necessary to remove fluorine from the atmosphere after the step (b). Although it may be carried out under normal pressure, it will require a long period of time, and the fluorine can be removed in a short period of time under reduced pressure as in the step (e).

Then, in the step (d), the transparent quartz glass body containing fluorine obtained in the step (c) is subjected to heat treatment in an atmosphere containing a hydrogen gas at a temperature of at most 600° C., to obtain a synthetic quartz glass. The pressure may, for example, be from 1 to 30 atm. By carrying out hydrogen treatment at a temperature of at most 600° C., the formation of the oxygen deficient defects of ≡Si—H and ≡Si—Si≡ can be prevented. As the atmosphere containing a hydrogen gas, preferred is an inert gas atmosphere containing a hydrogen gas in an amount of from 0.1 to 100 vol %. Further, to control the fictive temperature, it is preferred to carry out the following step (f) on the transparent quartz glass body:

(f) heat treatment wherein the transparent quartz glass body containing fluorine is hold at a temperature of from 800° C. to 1,100° C. for at least 5 hours, and then the temperature is decreased to be at most 750° C. at a temperature-decreasing rate of at most 10° C./hr, is carried out to control the fictive temperature of the synthetic quartz glass.

After the temperature is decreased to be at most 750° C., the transparent quartz glass body may be left for cooling. In this case, the atmosphere is preferably an inert gas 100% atmosphere such as helium, argon or nitrogen, an atmosphere containing such an inert gas as the main component, or the air atmosphere, and the pressure is preferably reduced pressure or normal pressure.

Further, the synthetic quartz glass of the present invention can be produced by carrying out the step (e) of holding the porous quartz glass body under a pressure of at most 1 Torr at a temperature of from 1,000 to 1,300° C. for a predetermined time for dehydration, and then raising the temperature to the transparent vitrification temperature under the pressure of at most 1 Torr for transparent vitrification, after the step (a).

The synthetic quartz glass of the present invention may be used for a stepper lends or other optical components.

To obtain optical characteristics required as the optical components, it is necessary to optionally carry out heat treatment such as uniformalization, molding or annealing (hereinafter referred to as optical heat treatment), and the optical heat treatment may be carried out before or after the step (d).

However, it is necessary to carry out the optical heat treatment at a high temperature of from 800 to 1,500° C., and accordingly there is a possibility that even if the hydrogen is contained in the synthetic quartz glass in the step (d), the hydrogen molecule concentration will decrease due to the successive optical heat treatment. Accordingly, in the case of carrying out the optical heat treatment after the step (d), the optical heat treatment is carried out preferably in an atmosphere containing a hydrogen gas in an amount of from 0.1 to 100 vol % under a pressure of from 1 to 30 atm.

Further, in the case of carrying out the optical heat treatment after the step (d), a furnace for the optical heat treatment is required to have an explosion-proof structure. Accordingly, it is preferred to carry out the optical heat treatment before the step (d).

In the present invention, by doping with boron, more fluorine can be doped. In the case of doping with boron, the boron source may, for example, be $BF_3$, $BCl_3$ or an alkoxide of boron.

Further, as a method of doping with boron and fluorine, a method of doping with boron, followed by doping with fluorine, may, for example, be mentioned.

Specifically, the dropping with boron and fluorine is carried out by, for example, the following method 1) or 2):

1) the porous quartz glass body obtained in the step (a) is set in a pressure container, the pressure in the pressure container is reduced to a level of 1 Torr, and then a gas containing the boron source (such as $BCl_3$ vapor diluted to a level of 5 vol % by an inert gas such as He) is introduced thereinto.

When the pressure is brought to the vicinity of normal pressure, the introduction of the above-mentioned gas containing the boron source is terminated, and the porous quartz glass body is left for a predetermined time for doping with boron.

Then, the doping with fluorine is carried out in accordance with the step (b);

2) the porous quartz glass body obtained in the step (a) is treated with a vapor of an alkoxide of boron, and then hydrolysis of the alkoxide of boron is carried out in a moistened atmosphere to have fine $B_2O_3$ particles deposited in the porous quartz glass body.

Then, the doping with fluorine is carried out in accordance with the step (b).

By the above-mentioned method 1) or 2), the porous quartz glass body doped with boron, can further be doped with fluorine, and doped with more fluorine. After doping with fluorine, the steps (c) and (d) are carried out to obtain a synthetic quartz glass for optical components.

In this case, the fluorine doping can be carried out, for example, as follows.

An inert gas (such as He or $N_2$) is introduced into the above-mentioned pressure container, to obtain a normal pressure. The pressure in the pressure container is reduced to a level of 1 Torr again, and then a $SiF_4$ gas diluted with an inert gas (such as He) is introduced thereinto.

When the pressure is brought to the vicinity of normal pressure, the introduction of the above-mentioned $SiF_4$ gas diluted with an inert gas is terminated, and the fluorine-containing porous quartz glass body is left for a predetermined time for doping with fluorine.

Now, the present invention will be described in further detail with reference to Examples. However, it should be understood that the present invention is by no means restricted thereto. Evaluations of the synthetic quartz glass produced by the following Examples were carried out in accordance with the following methods.

EVALUATIONS

Evaluation 1: measurement of fluorine concentration

A synthetic quartz glass is melted under heating with anhydrous sodium carbonate, and deionized water and hydrochloric acid (volume ratio 1:1) were added to the obtained melt, to prepare a sample liquid. The electromotive force of the sample liquid was measured by a radiometer by using, as a fluorine ion selective electrode and a comparative electrode, No. 945-220 and No. 945-468, respectively, manufactured by Radiometer Trading, to obtain a fluorine concentration based on a standard curve which was preliminarily prepared by using a fluorine ion standard solution (Bulletin of Japan Chemical Association, 1972 (2), 350).

Evaluation 2: measurement of hydrogen molecule concentration

Raman spectrometry was carried out, and the hydrogen molecule concentration [molecules/cm$^3$] was obtained from the intensity ratio of the intensity detected from the scattering peak of 4,135 cm$^{-1}$ ($I_{4135}$) to the intensity of the scattering peak of 800 cm$^{-1}$ ($I_{800}$), i.e. $I_{4135}/I_{800}$, in the laser Raman spectrum (V. S. Khotimchenko et al., Zhurnal Prikladnoi Spektroskopii, 46 (6), 987–997 (1986)). In the present method, the limit of detection was $1\times10^{16}$ molecules/cm$^3$.

Evaluation 3: measurement of OH group concentration

Measurement by an infrared spectrophotometer was carried out to obtain the OH group concentration from the absorption peak at a wavelength of 2.7 $\mu$m (J. P. Wiiliams et al., Ceram. Bull., 55 (5), 524 (1976)).

Evaluation 4

Raman spectrometry was carried out, and the concentration of the $\equiv$Si—H defects ($\equiv$Si—H concentration) was evaluated based on the value ($I_{2250}/I_{800}$) obtained by dividing the intensity detected from the scattering peak of 2,250 cm$^{-1}$ ($I_{2250}$) by the intensity of the scattering peak of 800 cm$^{-1}$ ($I_{800}$), in the laser Raman spectrum. Here, the limit of detection was $I_{2250}/I_{800}=1\times10^{-4}$. The smaller the value of $I_{2250}/I_{800}$, the better the results are.

Evaluation 5

By using an ultraviolet visible spectrophotometer, the transmittance of light having a wavelength of 245 nm was measured with respect to a sample with a thickness of 10 mm and a sample with a thickness of 35 mm, and an absorption coefficient of 245 nm was calculated from these transmittances, to evaluate the presence or absence of the formation of the $\equiv$Si—Si$\equiv$ defect. The smaller the value of the absorption coefficient of 245 nm, the better the results are.

Evaluation 6: oxygen deficient defects

By using a vacuum ultraviolet spectrophotometer (VTMS-502 manufactured by Acton Research), the transmittance at 163 nm was measured with respect to a sample with a thickness of 10 mm and a sample with a thickness of 4 mm, and the absorption coefficient at a wavelength of 163 nm ($k_{163}$) was obtained from the measured results. When the relation with the OH group concentration ($C_{OH}$, unit:ppm) contained in said sample satisfied $k_{163} \geq 0.02 \times (C_{OH})^{0.85}$, the sample was evaluated that the oxygen deficient defects were "present", and when the relation did not satisfy the above formula, the sample was evaluated that the oxygen deficient defects were "absent".

Evaluation 7

A sample was irradiated with light from a KrF excimer laser (LPX-120i manufactured by Lambda Physik) with an energy density of 100 mJ/cm$^2$/Pulse at a frequency of 200 Hz. The transmittance at 214 nm was measured by an ultraviolet visible spectrophotometer immediately after $5\times10^6$ shot irradiation with the KrF excimer laser light, and the 214 nm absorption intensity by the paramagnetic defect E' center formed due to irradiation by the KrF excimer laser, was evaluated based on the amount of change in the absorption coefficient $\Delta k_{214}$ [cm$^{-1}$] before and after the irradiation. The smaller the value of $\Delta k_{214}$, the more the E' center was decreased, and the better the results are.

Evaluation 8: evaluation of fluorescence emission

A sample was irradiated with light from the KrF excimer laser (LPX-120i manufactured by Lambda Physik) with an energy density of 100 mJ/cm$^2$/Pulse with a frequency of 200 Hz. The fluorescence intensity of 650 nm ($L_{650}$) and the scattering light intensity of 248 nm ($S_{248}$) after $1\times10^6$ shot irradiation by the KrF excimer laser, were measured by using a spectrophotometer, to obtain the ratio of the fluorescence intensity of 650 nm ($L_{650}$) to the scattering light intensity of 248 nm ($S_{248}$), i.e. $L_{650}/S_{248}$, whereupon the fluorescence intensity of 650 nm was evaluated. The smaller the value of $L_{650}/S_{248}$, the more the fluorescence emission was suppressed, and the better the results are.

Evaluation 9: internal transmittance at 172 nm

By using a vacuum ultraviolet spectrophotometer (VTMS-502 manufactured by Acton Research), the internal transmittance at 172 nm was measured with respect to a sample with a thickness of 10 mm and sample with a thickness of 4 mm, as an index of the transmittance at the vacuum ultraviolet region with a wavelength of at most 175 nm.

Evaluation 10: internal transmittance at 157 nm

By using a vacuum ultraviolet spectrophotometer (VTMS-502 manufactured by Acton Research), the internal transmittance at 157 nm was measured with respect to a sample with a thickness of 10 mm and a sample with a thickness of 4 mm, as an index of the transmittance of at most 160 nm, and the internal transmittance at said wavelength was obtained from the following formula:

Internal transmittance (%/cm)=exp(−ln($T_1/T_2$)/$d_1−d_2$))×100 wherein $T_1$ is the transmittance (%) of a sample with a thickness of $d_1$ [cm], and $T_2$ is the transmittance (%) of a sample with a thickness of $d_2$ [cm]. The higher the transmittance, the better the results are.

Evaluation 11

A sample with a thickness of 10 mm was irradiated with a $Xe_2$* excimer lamp under a condition of 10 mW/cm$^2$ for 3 hours. The transmittance at 163 nm before and after the irradiation was measured, to calculate the change in transmittance at 163 nm ($\Delta T_{163}$) due to the irradiation. The smaller the $\Delta T_{163}$, the more excellent in durability to ultraviolet light.

Evaluation 12: measurement of fictive temperature

The fictive temperature was obtained in accordance with the method by A. Agarwal et al. (J. Non-Cryst., 185, 191, 1995). Quartz glass subjected to mirror polishing was soaked in an aqueous solution comprising 10% of HF and 2.5% of $H_2SO_4$, to remove e.g. abrasive grains or flaws remaining on the surface. The reflective spectrum on the surface was obtained by means of an infrared spectrometer (Magna 760 manufactured by Nikolet). At this time, the angle of incidence of the infrared lights was fixed at 6.5°, the data were taken at intervals of about 0.5 cm$^{-1}$, and scanning was carried out for 64 times, whereupon the average value was obtained. With respect to the infrared reflective spectrum thus obtain, the largest peak observed at about 1,120 cm$^{-1}$ was attributable to the stretching vibration due to the Si—O—Si bond of quartz glass. The fictive temperature ($T_f$, unit:K) was obtained from the following correlation formula, where the peak location was ν (cm$^{-1}$):

ν=1114.51+(11603.51$T_f$)

Evaluation 13: measurement of chlorine concentration

Fluorescent X-ray analysis was carried out by means of Cr kα-ray, to measure the characteristic X-ray intensity of chlorine, whereupon the chlorine concentration in the synthetic quartz glass was obtained. In the present method, the limit of detection was 2 ppm.

Evaluation 14: evaluation of unstable structure

Raman spectrometry (Ramoner T64000 manufactured by Jobin Ybon, excitation light source: argon ion laser (wavelength 514.5 nm)) was carried out, to obtain the intensity ratios of the scattering peak intensity of 495 cm$^{-1}$ ($I_1$) and the scattering peak intensity of 605 cm$^{-1}$ ($I_2$) to the scattering peak intensity of 440 cm$^{-1}$ ($I_0$), i.e. $I_1/I_0$ and $I_2/I_0$, in the laser Raman spectrum. The smaller the values of the intensity ratios $I_1/I_0$ and $I_2/I_0$, the better.

The scattering peak intensities $I_1$, $I_2$ and $I_0$ were obtained as follows.

Curve fitting was carried out by means of one Lorenz function to each of the scattering peak of 495 cm$^{-1}$ and the scattering peak of 605 cm$^{-1}$, and approximation was carried out to minimize the least squares error to the real spectrum, whereupon the coefficients of the respective functions were determined.

The curve fitting was carried out by synthesis of three Gaussian functions for the scattering peak of 440 cm$^{-1}$, and by a secondary function for the rest (base line) obtained by removal of the scattering peak of 495 cm$^{-1}$, the scattering peak of 605 cm$^{-1}$ and the scattering peak of 440 cm$^{-1}$, and approximation was carried out to minimize the least squares error to the real spectrum, whereupon the coefficients of the respective functions were determined.

By using the functions obtained as mentioned above, the intensities of the respective scattering peaks were obtained.

Evaluation 15

By ICP mass spectrometry (SPQ9000 manufactured by Seiko Installments), the Na, Ca, Mg, Fe, Ni, Cu, Zn and Ti concentrations in the synthetic quartz glass were analyzed. The limits of detection of such impurities were 0.1 ppb with respect to Ni and Cu, and 0.3 ppb with respect to the other.

Evaluation 16

The 200 mm φ plane on a synthetic quartz glass sample was perpendicularly irradiated with helium-neon laser light by an oil-on-plate method by means of a Fizeau interferometer, to measure the refractive index distribution in the 200 mm φ plane.

EXAMPLE 1

Fine quartz glass particles obtained by subjecting $SiCl_4$ as a quartz glass forming material to hydrolysis under heating in an oxyhydrogen flame (flame hydrolysis) by a known method, were deposited and grown on a substrate, to form a porous quartz glass body having a diameter of 35 cm and a length of 100 cm (step (a)). The obtained porous quartz glass body was installed in an electric furnace capable of controlling the atmosphere, and held at room temperature under a reduced pressure of 10 Torr for 1 hour. Then, while introducing a mixed gas of He and $SiF_4$ with a volume ratio of 99 to 1 thereinto, the porous quart glass body was held in this atmosphere at room temperature under normal pressure for 5 hours, to carry out fluorine doping (step (b)). Then, the supply of $SiF_4$ was terminated, and the porous quartz glass body was held in a He 100% atmosphere for 10 hours, then the temperature was raised to 1,450° C. in a He 100% atmosphere, and the porous quartz glass body was held at this temperature for 10 hours for transparent vitrification, to obtain a transparent quartz glass body containing fluorine (step (c)).

The obtained transparent quartz glass body containing fluorine was subjected to deformation by gravity under heating to 1,750° C. which was at least the softening point, in an electric furnace provided with a carbon heating element, to mold into a block of 250 mm×250 mm×120 mm, which was then sliced into a block with a thickness of 30 mm. The obtained block of 250 mm×250 mm×30 mm was held in a hydrogen 100% atmosphere under 10 atm at 500° C. for 250 hours, to carry out hydrogen doping treatment, and a synthetic quartz glass was obtained (step (d)).

EXAMPLE 2

A synthetic quartz glass was prepared in the same manner as in Example 1, except that in the step (b) of Example 1, the porous quartz glass body was installed in the electric furnace, and the temperature was raised to 300° C. firstly, and the porous quartz glass body was held for 1 hour under a reduced pressure of 10 Torr, then a mixed gas of He and $SiF_4$ with a volume ratio of 99 to 1 was introduced, and the porous quartz glass body was held in this atmosphere at 300° C. under normal pressure for 5 hours, to carry out fluorine doping.

EXAMPLE 3

A synthetic quartz glass was prepared in the same manner as in Example 1, except that in the step (b) of Example 1, the porous quartz glass body was installed in the electric furnace, and the temperature was raised to 500° C. firstly, and the porous quartz glass body was held for 1 hour under a reduced pressure of 10 Torr, then a mixed gas of He and $SiF_4$ with a volume ratio of 99 to 1 was introduced, and the porous quartz glass body was held in this atmosphere at 500° C. under normal pressure for 5 hours, to carry out fluorine doping.

EXAMPLE 4

A synthetic quartz glass was prepared in the same manner as in Example 1, except that in the step (b) of Example 1, the porous quartz glass body was installed in the electric furnace, and the temperature was raised to 700° C. firstly, and the porous quartz glass body was held for 1 hour under a reduced pressure of 10 Torr, then a mixed gas of He and $SiF_4$ with a volume ratio of 99 to 1 was introduced, and the porous quartz glass body was held in this atmosphere at 700° C. under normal pressure for 5 hours, to carry out fluorine doping.

EXAMPLE 5

A synthetic quartz glass was prepared in the same manner as in Example 1, except that in the step (b) of Example 1, the porous quartz glass body was installed in the electric furnace, and the temperature was raised to 1200° C. firstly, and the porous quartz glass body was held for 1 hour under a reduced pressure of 10 Torr, then a mixed gas of He and $SiF_4$ with a volume ratio of 99 to 1 was introduced, and the porous quartz glass body was held in this atmosphere at 1200° C. under normal pressure for 5 hours, to carry out fluorine doping.

EXAMPLE 6

A synthetic quartz glass was prepared in the same manner as in Example 1, except that in the step (b) of Example 1, the porous quartz glass body was installed in the electric furnace, and the temperature was raised to 300° C. firstly, and the porous quartz glass body was held for 1 hour under a reduced pressure of 10 Torr, then a mixed gas of He and $SiF_4$ with a volume ratio of 99.9 to 0.1 was introduced, and the porous quartz glass body was held in this atmosphere at 300° C. under normal pressure for 1 hour, to carry out fluorine doping.

EXAMPLE 7

A synthetic quartz glass was prepared in the same manner as in Example 1, except that in the step (b) of Example 1, the porous quartz glass body was installed in the electric furnace, and the temperature was raised to 300° C. firstly, and the porous quartz glass body was held for 1 hour under a reduced pressure of 10 Torr, then a mixed gas of He and $SiF_4$ with a volume ratio of 99.9 to 0.1 was introduced, and the porous quartz glass body was held in this atmosphere at 300° C. under 300 Torr for 1 hour, to carry out fluorine doping.

EXAMPLE 8

A synthetic quartz glass was prepared in the same manner as in Example 1, except that in the step (b) of Example 1, the porous quartz glass body was installed in the electric furnace, and the temperature was raised to 300° C. firstly, and the porous quartz glass body was held for 1 hour under a reduced pressure of 10 Torr, then a mixed gas of He and $SiF_4$ with a volume ratio of 99.9 to 0.1 was introduced, and the porous quartz glass body was held in this atmosphere at 300° C. under 100 Torr for 1 hour, to carry out fluorine doping.

EXAMPLE 9

A synthetic quartz glass was prepared in the same manner as in Example 1, except that in the step (d) of Example 1, the block was held in a hydrogen 100% atmosphere under 1 atm at a temperature of 500° C. for 250 hours, to carry out hydrogen doping treatment.

EXAMPLE 10

A synthetic quartz glass was prepared in the same manner as in Example 1, except that in the step (d) of Example 1, the block was held in an atmosphere of a mixed gas of hydrogen and helium with a volume of ratio of 10 to 90 under 1 atm at a temperature of 500° C. for 250 hours, to carry out hydrogen doping treatment.

EXAMPLE 11

A synthetic quartz glass was prepared in the same manner as in Example 1, except that in the step (d) of Example 1, the block was held in a hydrogen 100% atmosphere under 10 atm at a temperature of 700° C. for 250 hours, to carry out hydrogen doping treatment.

EXAMPLE 12

A synthetic quartz glass was prepared in the same manner as in Example 1, except that in the step (d) of Example 1, the block was held in a hydrogen 100% atmosphere under 10 atm at a temperature of 900° C. for 250 hours, to carry out hydrogen doping treatment.

EXAMPLE 13

A synthetic quartz glass was prepared in the same manner as in Example 1, except that the step (b) was not carried out, the temperature was raised to 1,450° C. in a He 100% atmosphere, and the porous quartz glass body was held at this temperature for 10 hours for transparent vitrification.

EXAMPLE 14

After the step (b) of Example 1, the supply of $SiF_4$ was terminated, the pressure was reduced to 1 Torr, and the porous quartz glass body was held in such a state for 1 hour (step (e)). Then, 100% of He was introduced to recover the normal pressure, and the pressure was reduced to 1 Torr again, to obtain an atmosphere containing substantially no fluorine. The temperature was raised to 1,450° C. in said atmosphere, and the porous quartz glass body was held at 1,450° C. for 10 hours for transparent vitrification, to obtain a transparent quartz glass body containing fluorine (step (c)). The subsequent operation was carried out in the same manner as in Example 1, to prepare a synthetic quartz glass.

EXAMPLE 15

After the step (b) of Example 1, the supply of $SiF_4$ was terminated, and the porous quartz glass body was held in a He 100% atmosphere for 10 hours, and further held in an atmosphere of a mixed gas of He and $SiF_4$ with a volume ratio of 99.95 to 0.05 for 10 hours. Then, the temperature was raised to 1,450° C., and the porous quartz glass body was held at 1,450° C. for 10 hours for transparent vitrification, to obtain a transparent quartz glass body containing fluorine (step (c)). The subsequent operation was carried out in the same manner as in Example 1, to prepare a synthetic quartz glass.

EXAMPLE 16

After the step (b) of Example 1, the supply of $SiF_4$ was terminated, and the porous quartz glass body was held in a He 100% atmosphere for 10 hours, and further held in an atmosphere of a mixed gas of He and $SiF_4$ with a volume ratio of 99.8 to 0.2 for 10 hours. Then, the temperature was raised to 1,450° C., and the porous quartz glass body was held at 1,450° C. for 10 hours for transparent vitrification, to obtain a transparent quartz glass body containing fluorine (step (c)). The subsequent operation was carried out in the same manner as in Example 1, to prepare a synthetic quartz glass.

The synthetic quartz glass obtained in each of Examples 1 to 16 was evaluated. The results of the evaluations are shown in Table 1. "ND" represents that the value was at most the limit of detection. Examples 1 to 3, 6 to 10, 14 and 15 are Working Examples, and Examples 4 and 5, 11 to 13 and 16 are Comparative Examples.

EXAMPLES 17 TO 31

Fine $SiO_2$ particles formed by subjecting $SiCl_4$ or $Si(CH_3O)_4$ to hydrolysis in an oxyhydrogen flame of from 1,200 to 1,500° C., were deposited on a substrate to produce a porous quartz glass body having a diameter of 500 mm and a length of 600 mm, according to a known soot method. The porous quartz glass body was installed in an electric furnace capable of controlling the atmosphere, a helium gas containing $SiF_4$ in a ratio as shown in Table 2 was introduced under a reduced pressure of at most 10 Torr, and the porous quartz glass body was held in this atmosphere under normal pressure at room temperature for a time as shown in Table 2, to carry out dehydration in the porous quartz glass body, and at the same time, to carry out doping with fluorine. Then, the temperature was raised to 1,450° C. while holding the porous quartz glass body in a reduced pressure of at most 10 Torr, and the porous quartz glass body was held at this temperature for 10 hours, to produce a transparent quartz glass body having diameter of 200 mm and a length of 450 mm.

Further, the obtained transparent quartz glass body was sliced to have a diameter of 200 mm and a thickness of 10 mm, and held in an atmosphere containing hydrogen in a ratio as shown in Table 2 under a pressure as shown in Table 2 at 500° C. for 30 hours. In the above-mentioned production process, the OH group concentration and the fluorine concentration in quartz glass were controlled by adjusting the flow rate ratio of oxygen gas to hydrogen gas based on the material gas for producing the porous quartz glass, or the concentration of the fluorine compound and holding time at the time of holding the porous quartz glass body in an atmosphere containing the fluorine compound. Further, the hydrogen molecule concentration in the quartz glass was controlled by adjusting the hydrogen concentration and the total pressure in the atmosphere at the time of holding the porous quarts glass body in a hydrogen atmosphere. The production conditions (the glass forming material, the flow

TABLE 1

| Ex. | Evaluation 1 Fluorine conc. (ppm) | Evaluation 2 Hydrogen conc. [molecules/cm$^3$] | Evaluation 3 OH conc. (ppm) | Evalution 4 ≡Si—H conc. ($I_{2250}/I_{800}$) [–] | Evaluation 5 245 nm absorption coefficient [cm$^{-1}$] | Evaluation 6 163 nm absorption | Evaluation 7 $\Delta k_{214}$ [cm$^{-1}$] | Evaluation 8 Fluorescence intensity ratio $L_{650}/S_{248}$ [–] |
|---|---|---|---|---|---|---|---|---|
| 1 | 816 | $2.9 \times 10^{18}$ | 5.1 | $<1 \times 10^{-4}$ | $7.2 \times 10^{-4}$ | Absent | $8.0 \times 10^{-3}$ | $3.1 \times 10^{-5}$ |
| 2 | 983 | $3.0 \times 10$ | 3.8 | $<1 \times 10^{-1}$ | $7.4 \times 10^{-4}$ | Absent | $8.1 \times 10^{-3}$ | $2.0 \times 10^{-5}$ |
| 3 | 1161 | $3.0 \times 10^{18}$ | 3.2 | $<1 \times 10^{-4}$ | $7.6 \times 10^{-4}$ | Absent | $9.0 \times 10^{-3}$ | $2.1 \times 10^{-5}$ |
| 4 | 2219 | $2.9 \times 10^{18}$ | 1.9 | $<1 \times 10^{-4}$ | $2.3 \times 10^{-3}$ | Present | $6.2 \times 10^{-1}$ | $2.5 \times 10^{-5}$ |
| 5 | 10412 | $2.9 \times 10^{18}$ | ND | $<1 \times 10^{-4}$ | $4.7 \times 10^{-2}$ | Present | $1.5 \times 10^{0}$ | $1.5 \times 10^{-5}$ |
| 6 | 325 | $2.8 \times 10^{18}$ | 12 | $<1 \times 10^{-4}$ | $7.4 \times 10^{-4}$ | Absent | $8.0 \times 10^{-3}$ | $6.2 \times 10^{-5}$ |
| 7 | 150 | $3.0 \times 10^{18}$ | 40 | $<1 \times 10^{-4}$ | $7.5 \times 10^{-4}$ | Absent | $8.1 \times 10^{-3}$ | $1.3 \times 10^{-4}$ |
| 8 | 50 | $3.0 \times 10^{18}$ | 110 | $<1 \times 10^{-4}$ | $7.4 \times 10^{-4}$ | Absent | $8.2 \times 10^{-3}$ | $2.5 \times 10^{-4}$ |
| 9 | 816 | $2.8 \times 10^{17}$ | 5.2 | $<1 \times 10^{-4}$ | $7.3 \times 10^{-4}$ | Absent | $1.6 \times 10^{-2}$ | $3.5 \times 10^{-5}$ |
| 10 | 816 | $2.5 \times 10^{16}$ | 5.3 | $<1 \times 10^{-4}$ | $7.4 \times 10^{-4}$ | Absent | $3.2 \times 10^{-2}$ | $3.3 \times 10^{-5}$ |
| 11 | 816 | $1.8 \times 10^{18}$ | 5.0 | $6.8 \times 10^{-3}$ | $7.2 \times 10^{-4}$ | Absent | $2.7 \times 10^{-1}$ | $3.3 \times 10^{-5}$ |
| 12 | 816 | $1.3 \times 10^{18}$ | 5.1 | $1.0 \times 10^{-2}$ | $7.3 \times 10^{-4}$ | Absent | $3.2 \times 10^{-1}$ | $3.4 \times 10^{-5}$ |
| 13 | 0 | $2.9 \times 10^{18}$ | 400 | $<1 \times 10^{-4}$ | $7.3 \times 10^{-4}$ | Absent | $9.0 \times 10^{-3}$ | $9.8 \times 10^{-4}$ |
| 14 | 816 | $3.0 \times 10^{18}$ | 5.6 | $<1 \times 10^{-4}$ | $7.3 \times 10^{-4}$ | Absent | $7.8 \times 10^{-3}$ | $2.7 \times 10^{-5}$ |
| 15 | 816 | $2.9 \times 10^{18}$ | 4.3 | $<1 \times 10^{-4}$ | $7.3 \times 10^{-4}$ | Absent | $7.8 \times 10^{-3}$ | $3.0 \times 10^{-5}$ |
| 16 | 913 | $2.9 \times 10^{18}$ | 2.1 | $<1 \times 10^{-4}$ | $2.5 \times 10^{-3}$ | Present | $6.5 \times 10^{-1}$ | $2.7 \times 10^{-5}$ |

Examples 17 to 34 are experimental examples wherein the influences of the OH group concentration, the chlorine concentration and the fluorine concentration on the characteristics of the synthetic quartz glass were studied.

rate ratio of oxygen gas to hydrogen gas, the concentration and pressure of the fluorine compound, and the concentration and pressure of hydrogen) are shown in Table 2 in detail.

TABLE 2

| Ex. | Production process | Glass forming material | Flame hydrolysis condition ($O_2/H_2$ volume ratio based on glass forming material) | Fluorine doping conditions (fluorine conc., time) | | Hydrogen doping conditions (hydrogen conc., pressure) | |
|---|---|---|---|---|---|---|---|
| 17 | Soot method | $SiCl_4$ | 15/25 | $SiF_6$/He = 1/99 vol % | 10 hr | $H_2$ = 100 vol % | 10 atm |
| 18 | Soot method | $SiCl_4$ | 15/25 | $SiF_4$/He = 1/99 vol % | 3 hr | $H_2$ = 100 vol % | 10 atm |
| 19 | Soot method | $SiCl_4$ | 15/25 | $SiF_4$/He = 1/99 vol % | 2 hr | $H_2$ = 100 vol % | 10 atm |
| 20 | Soot method | $SiCl_4$ | 15/25 | $SiF_4$/He = 1/99 vol % | 1 hr | $H_2$ = 100 vol % | 10 atm |
| 21 | Soot method | $SiCl_4$ | 15/25 | $SiF_4$/He = 1/99 vol % | 30 min | $H_2$ = 100 vol % | 10 atm |
| 22 | Soot method | $SiCl_4$ | 15/25 | $SiF_4$/He = 1/99 vol % | 5 min | $H_2$ = 100 vol % | 10 atm |
| 23 | Soot method | $SiCl_4$ | 15/25 | No treatment | | $H_2$ = 100 vol % | 10 atm |
| 24 | Soot method | $Si(CH_3O)_4$ | 0/0 | $SiF_4$/He = 1/99 vol % | 3 hr | $H_2$ = 100 vol % | 10 atm |
| 25 | Soot method | $SiCl_4$ | 11/30 | $SiF_4$/He = 1/99 vol % | 3 hr | $H_2$ = 100 vol % | 10 atm |
| 26 | Soot method | $SiCl_4$ | 13/27 | $SiF_4$/He = 1/99 vol % | 3 hr | $H_2$ = 100 vol % | 10 atm |
| 27 | Soot method | $SiCl_4$ | 16/22 | $SiF_4$/He = 1/99 vol % | 3 hr | $H_2$ = 100 vol % | 10 atm |
| 28 | Soot method | $SiCl_4$ | 15/25 | $SiF_4/SiCl_4$/He = 1/0.01/98.99 vol % | 1 hr | $H_2$ = 100 vol % | 10 atm |
| 29 | Soot method | $SiCl_4$ | 15/25 | $SiF_4/SiCl_4$/He = 1/0.2/99.98 vol % | 1 hr | $H_2$ = 100 vol % | 10 atm |
| 30 | Soot method | $SiCl_4$ | 15/25 | $SiF_4$/He = 1/99 vol % | 3 hr | $H_2$ = 100 vol % | 5 atm |
| 31 | Soot method | $SiCl_4$ | 15/25 | $SiF_4$/He = 1/99 vol % | 3 hr | $H_2$/He = 10/90 vol % | 1 atm |

EXAMPLES 32 TO 34

According to a known direct method, $SiCl_4$ was used as the glass forming material, and $SiF_4$ was subjected to hydrolysis and oxidation in an oxyhydrogen flame of from 1,800 to 2,000° C. with a flow rate ratio of oxygen gas to hydrogen gas based on the material gas as shown in Table 3, to produce a transparent quartz glass body directly on a substrate. In this production process, the fluorine concentration in the obtained quartz glass was controlled by adjusting the mixing ratio of $SiCl_4$ and $SiF_4$, and the OH group concentration and the hydrogen concentration were controlled by adjusting the flow rate ratio of oxygen to hydrogen. The production conditions (flow rate ratio of $SiF_4$, oxygen gas and hydrogen gas) are shown in Table 3 in detail.

TABLE 3

| Ex. | Production process | Glass forming material | Flame hydrolysis condition ($SiF_4/O_2/H_2$ volume ratio based on glass forming material) |
|---|---|---|---|
| 32 | Direct method | $SiCl_4$ | 0.8/140/200 |
| 33 | Direct method | $SiCl_4$ | 0.8/80/800 |
| 34 | Direct method | $SiCl_4$ | 0.0/150/200 |

The OH group concentration, the chlorine concentration, the fluorine concentration and the hydrogen molecule concentration of the synthetic quartz glass produced by each of Examples 17 to 34 are shown in Table 4. The concentrations were obtained by the above-mentioned methods, and "ND" represents that the value was at most the limit of detection.

TABLE 4

| Ex. | OH group concentration (ppm) | Chlorine concentration (ppm) | Fluorine concentration (ppm) | Hydrogen molecule concentration [molecules/cm$^3$] |
|---|---|---|---|---|
| 17 | 5.5 | 7.2 | 913 | $1.8 \times 10^{18}$ |
| 18 | 21 | 7.0 | 873 | $1.8 \times 10^{18}$ |
| 19 | 46 | 6.9 | 864 | $1.9 \times 10^{18}$ |
| 20 | 73 | 6.8 | 835 | $1.8 \times 10^{18}$ |
| 21 | 118 | 7.0 | 639 | $1.9 \times 10^{18}$ |
| 22 | 230 | 7.1 | 369 | $1.8 \times 10^{18}$ |
| 23 | 39 | 7.2 | ND | $1.8 \times 10^{18}$ |
| 24 | 21 | ND | 866 | $1.8 \times 10^{18}$ |
| 25 | 20 | 6.8 | 114 | $1.8 \times 10^{18}$ |
| 26 | 22 | 6.7 | 220 | $1.8 \times 10^{18}$ |
| 27 | 21 | 6.9 | 1860 | $1.8 \times 10^{18}$ |
| 28 | 21 | 61 | 873 | $1.8 \times 10^{18}$ |
| 29 | 19 | 134 | 462 | $1.9 \times 10^{18}$ |
| 30 | 21 | 7.0 | 854 | $5.4 \times 10^{17}$ |
| 31 | 20 | 7.1 | 829 | $1.8 \times 10^{16}$ |
| 32 | 950 | 72 | 1271 | $3.1 \times 10^{18}$ |
| 33 | 45 | 73 | 1293 | $3.1 \times 10^{18}$ |
| 34 | 930 | 68 | ND | $3.1 \times 10^{18}$ |

Then, with respect to the synthetic quartz glass produced in each of Examples 17 to 34, the scattering peak intensity ratios ($I_1/I_0$, $I_2/I_0$), $\Delta k_{214}$, $L_{650}/S_{248}$, the internal transmittance at a wavelength of 157 nm, and the impurity concentration in the synthetic quartz glass were measured for evaluation. The evaluation results are shown in Table 5. Among Examples 17 to 34, Examples 20, 21, 22, 32 and 34 with a high OH group concentration, Example 29 with a high chlorine concentration, and Examples 23 and 24 with no fluorine contained, were inferior to the others in characteristics.

TABLE 5

| Ex. | Evaluation 1 $I_1/I_0$ [−] | $I_2/I_0$ [−] | Evaluation 2 $\Delta k_{214}$ [cm$^{-1}$] | Evaluation 3 $L_{650}/S_{248}$ [−] | Evaluation 4 Transmittance at 157 nm (%/cm) | Evaluation 5 Impurity concentration (ppb) |
|---|---|---|---|---|---|---|
| 17 | 0.560 | 0.123 | 6.03 × 10$^{-3}$ | 1.8 × 10$^{-5}$ | 78.1 | Entirely ND |
| 18 | 0.560 | 0.123 | 6.05 × 10$^{-3}$ | 3.6 × 10$^{-5}$ | 54.4 | Entirely ND |
| 19 | 0.560 | 0.123 | 6.13 × 10$^{-3}$ | 5.1 × 10$^{-5}$ | 35.6 | Entirely ND |
| 20 | 0.559 | 0.123 | 6.03 × 10$^{-3}$ | 6.7 × 10$^{-5}$ | 24.4 | Entirely ND |
| 21 | 0.562 | 0.124 | 6.05 × 10$^{-3}$ | 8.4 × 10$^{-5}$ | 14.2 | Entirely ND |
| 22 | 0.564 | 0.125 | 6.07 × 10$^{-3}$ | 1.2 × 10$^{-4}$ | 4.7 | Entirely ND |
| 23 | 0.589 | 0.138 | 1.56 × 10$^{-2}$ | 3.6 × 10$^{-5}$ | 39.7 | Entirely ND |
| 24 | 0.561 | 0.123 | 5.98 × 10$^{-3}$ | 3.6 × 10$^{-5}$ | 54.4 | Entirely ND |
| 25 | 0.568 | 0.129 | 8.84 × 10$^{-3}$ | 3.6 × 10$^{-5}$ | 55.5 | Entirely ND |
| 26 | 0.566 | 0.128 | 8.16 × 10$^{-3}$ | 3.7 × 10$^{-5}$ | 53.4 | Entirely ND |
| 27 | 0.543 | 0.115 | 5.48 × 10$^{-3}$ | 3.6 × 10$^{-5}$ | 54.4 | Entirely ND |
| 28 | 0.560 | 0.123 | 9.38 × 10$^{-3}$ | 3.7 × 10$^{-5}$ | 54.4 | Entirely ND |
| 29 | 0.570 | 0.128 | 4.03 × 10$^{-3}$ | 3.6 × 10$^{-5}$ | 56.6 | Entirely ND |
| 30 | 0.561 | 0.124 | 7.56 × 10$^{-3}$ | 4.5 × 10$^{-5}$ | 54.4 | Entirely ND |
| 31 | 0.562 | 0.124 | 2.43 × 10$^{-2}$ | 1.6 × 10$^{-4}$ | 55.5 | Entirely ND |
| 32 | 0.516 | 0.101 | 1.51 × 10$^{-2}$ | 2.6 × 10$^{-4}$ | <0.1 | Entirely ND |
| 33 | 0.515 | 0.103 | 1.45 × 10$^{-2}$ | 3.6 × 10$^{-5}$ | 36.1 | Entirely ND |
| 34 | 0.552 | 0.119 | 1.61 × 10$^{-2}$ | 2.5 × 10$^{-4}$ | <0.1 | Entirely ND |

Examples 35 to 47 are experimental examples wherein the influences of $I_1/I_0$ and $I_2/I_0$ on the characteristics of the synthetic quartz glass were studied.

EXAMPLES 35 TO 47

According to a known soot method, fine $SiO_2$ particles formed by subjecting $SiCl_4$ to hydrolysis in an oxyhydrogen flame, were deposited on a substrate to prepare a porous quartz glass body of 500 mmφ×length 600 mm (step (a)). The porous quartz glass body was installed in an electric furnace capable of controlling the atmosphere, and a helium gas containing a fluorine compound was introduced thereinto from a reduced pressure of at most 10 Torr until normal pressure at room temperature. The porous quartz glass body was held in this atmosphere under normal pressure at room temperature for several hours, to carry out dehydration of the porous quartz glass and at the same time, to carry out doping with fluorine (step (b)). Then, the temperature was raised to 1,450° C. while holding the porous quartz glass body under a reduced pressure of at most 10 Torr, and it was held at this temperature for 10 hours to prepare a transparent quartz glass body (200 mmφ×length 450 mm).

Further, the obtained transparent quartz glass body was sliced into 200 mmφ×thickness 10 mm, and held in a hydrogen-containing atmosphere under conditions as shown in Table 6 at 500° C. for 30 hours, to dope the quartz glass with hydrogen to obtain a synthetic quartz glass of Examples 35 to 47 as shown in Table 7 (step (c)).

In the above-mentioned production process, the OH group concentration and the fluorine concentration in the quartz glass were controlled by adjusting the flow rate ratio of oxygen gas to hydrogen gas based on the material gas in the step (a), and the concentration of the fluorine compound and the treating time in the step (b). Further, the hydrogen molecule concentration in the quartz glass was controlled by adjusting the hydrogen concentration and the total pressure in the atmosphere at the time of hydrogen treatment in the step (c). Treatment conditions in the step (a), the step (b) and the step (c) in Examples are shown in Table 6 in detail.

TABLE 6

| | Step (a) Synthesis condition ($O_2$/ $H_2$ volume ratio based on glass forming material) | Step (b) Fluorine treatment conditions (atmosphere, treatment time) | Step (d) Hydrogen treatment conditions (atmosphere, pressure) |
|---|---|---|---|
| Ex. 35 | 14/26 | $SiF_4$/He = 1/99 vol % · 5 min | $H_2$ = 100 vol % · 10 atm |
| Ex. 36 | 14/26 | $SiF_4$/He = 1/99 vol % · 10 min | $H_2$ = 100 vol % · 10 atm |
| Ex. 37 | 13/27 | $SiF_4$/He = 1/99 vol % · 30 min | $H_2$ = 100 vol % · 10 atm |
| Ex. 38 | 14/26 | $SiF_4$/He = 1/99 vol % · 30 min | $H_2$ = 100 vol % · 10 atm |
| Ex. 39 | 15/25 | $SiF_4$/He = 1/99 vol % · 3 hr | $H_2$ = 100 vol % · 10 atm |
| Ex. 40 | 15/25 | $SiF_4$/He = 1/99 vol % · 3 hr | $H_2$ = 100 vol % · 10 atm |
| Ex. 41 | 15/25 | $SiF_4$/He = 1/99 vol % · 3 hr | $H_2$ = 100 vol % · 10 atm |
| Ex. 42 | 16/22 | $SiF_4$/He = 1/99 vol % · 3 hr | $H_2$ = 100 vol % · 10 atm |
| Ex. 43 | 15/20 | $SiF_4$/He = 1/99 vol % · 3 hr | $H_2$ = 100 vol % · 1 atm |
| Ex. 44 | 15/25 | $SiF_4$/He = 1/99 vol % · 3 hr | $H_2$/He = 15/85 vol % · 1 atm |
| Ex. 45 | 14/26 | $SiF_4$/He = 0.5/ 99.5 vol % · 5 min | $H_2$ = 100 vol % · 10 atm |
| Ex. 46 | 15/25 | No treatment | $H_2$ = 100 vol % · 10 atm |
| Ex. 47 | 13/25 | No treatment | $H_2$ = 100 vol % · 10 atm |

Then, with respect to a sample prepared from the synthetic quartz glass of each of Examples 35 to 47, the OH group concentration, the fluorine concentration and the hydrogen molecule concentration were measured in accordance with the following methods. Further, the scattering peak intensity ratios ($I_1/I_0$, $I_2/I_0$), $\Delta k_{214}$, $L_{650}/S_{248}$ and the internal transmittance at a wavelength of 157 nm, were measured and evaluated. The evaluation results are shown in Table 7. Among Examples 35 to 47, Examples 45 to 47 with high $I_1/I_0$ and $I_2/I_0$, were inferior to the others in characteristics.

TABLE 7

| | Fluorine conc. (ppm) | Hydrogen conc. [molecules/cm$^3$] | OH group conc. (ppm) | Evaluation 2 | | Evaluation 2 | Evaluation 3 |
| | | | | $I_1/I_0$ [-] | $I_2/I_0$ [-] | $\Delta k_{214}$ [cm$^{-1}$] | Internal transmittance at 157 nm (%/cm) |
|---|---|---|---|---|---|---|---|
| Ex. 35 | 130 | $1.8 \times 10^{18}$ | 241 | 0.584 | 0.136 | $9.10 \times 10^{-3}$ | 4.3 |
| Ex. 36 | 220 | $1.8 \times 10^{18}$ | 135 | 0.580 | 0.134 | $8.03 \times 10^{-3}$ | 11.9 |
| Ex. 37 | 220 | $1.8 \times 10^{18}$ | 38 | 0.580 | 0.134 | $8.35 \times 10^{-3}$ | 40.4 |
| Ex. 38 | 410 | $1.8 \times 10^{18}$ | 43 | 0.572 | 0.131 | $6.40 \times 10^{-3}$ | 37.3 |
| Ex. 39 | 815 | $1.7 \times 10^{18}$ | 13.8 | 0.561 | 0.127 | $6.15 \times 10^{-3}$ | 63.3 |
| Ex. 40 | 1014 | $1.8 \times 10^{18}$ | 6.8 | 0.557 | 0.125 | $5.98 \times 10^{-3}$ | 75.3 |
| Ex. 41 | 1076 | $1.8 \times 10^{18}$ | 3.2 | 0.555 | 0.125 | $5.52 \times 10^{-3}$ | 84.3 |
| Ex. 42 | 2274 | $1.8 \times 10^{18}$ | 1.2 | 0.535 | 0.116 | $5.37 \times 10^{-3}$ | 91.5 |
| Ex. 43 | 1013 | $1.7 \times 10^{17}$ | 6.7 | 0.557 | 0.125 | $1.12 \times 10^{-2}$ | 75.5 |
| Ex. 44 | 1013 | $1.7 \times 10^{16}$ | 5.6 | 0.557 | 0.125 | $2.29 \times 10^{-2}$ | 77.9 |
| Ex. 45 | 45 | $1.8 \times 10^{18}$ | 213 | 0.588 | 0.137 | $1.28 \times 10^{-2}$ | 5.5 |
| Ex. 46 | 0 | $1.8 \times 10^{18}$ | 198 | 0.590 | 0.138 | $1.62 \times 10^{-2}$ | 6.3 |
| Ex. 47 | 0 | $1.8 \times 10^{18}$ | 33 | 0.591 | 0.140 | $1.68 \times 10^{-2}$ | 43.9 |

Examples 48 to 65 are experimental examples wherein the influences of the OH group concentration and the concentration of the oxygen deficient defects on the characteristics of the synthetic quartz glass were studied.

EXAMPLES 48 TO 60

According to the soot method, fine $SiO_2$ particles formed by subjecting $SiCl_4$ to hydrolysis in an oxyhydrogen flame, were deposited on a substrate to prepare a porous quartz glass body of 400 mm$\phi$×length 600 mm. The porous quartz glass body was installed in an electric furnace capable of controlling the atmosphere, and held at room temperature under a reduced pressure of at most 10 Torr, and then a helium gas containing $SiF_4$ was introduced until the normal pressure. The porous quartz glass body was held in this atmosphere under normal pressure at room temperature for several hours for dehydration. Then, the temperature was raised to 1,450° C. while holding the porous quartz glass body in an atmosphere containing substantially no fluorine under a reduced pressure of at most 10 Torr, and the porous quartz glass body was held at this temperature for 10 hours, to prepare a synthetic quartz glass (200 mm$\phi$×length 450 mm).

Then, the obtained synthetic quartz glass was sliced into 200 mm$\phi$×thickness 10 mm, and held in a hydrogen-containing atmosphere under conditions as shown in Table 8 for 30 hours, to dope the synthetic quartz glass with hydrogen.

In the above-mentioned production stage, the OH group concentration and the concentration of the oxygen deficient defects in the obtained synthetic quartz glass were controlled by adjusting the volume ratio of oxygen gas to hydrogen gas in the oxyhydrogen flame at the time of producing the porous quartz glass body, and the concentration of the fluorine compound, the treating time and the treating temperature at the time of holding the porous glass body in an atmosphere containing the fluorine compound. Further, the hydrogen molecule concentration in the synthetic quartz glass was controlled by adjusting the treatment temperature, the hydrogen concentration and the total pressure in the atmosphere, at the time of carrying out the hydrogen doping. The treatment conditions in the production steps in Examples are shown in Table 8 in detail.

TABLE 8

| | Synthesis condition ($O_2$/$H_2$ volume ratio) | Fluorine treatment conditions (atmosphere, treatment temperature, treatment time) | Hydrogen treatment conditions (treatment temperature, atmosphere, pressure) |
|---|---|---|---|
| Ex. 48 | 15/25 | $SiF_4$/He = 1/99 vol % · 25° C. · 10 hr | 500° C. · $H_2$ = 100 vol % · 10 atm |
| Ex. 49 | 16/22 | $SiF_4$/He = 1/99 vol % · 25° C. · 10 hr | 500° C. · $H_2$ = 100 vol % · 10 atm |
| Ex. 50 | 15/25 | $SiF_4$/He = 1/99 vol % · 300° C. · 5 hr | 500° C. · $H_2$ = 100 vol % · 10 atm |
| Ex. 51 | 15/25 | $SiF_4$/He = 1/99 vol % · 550° C. · 5 hr | 500° C. · $H_2$ = 100 vol % · 10 atm |
| Ex. 52 | 15/25 | $SiF_4$/He = 1/99 vol % · 700° C. · 5 hr | 500° C. · $H_2$ = 100 vol % · 10 atm |
| Ex. 53 | 15/25 | $SiF_4$/He = 1/99 vol % · 900° C. · 5 hr | 500° C. · $H_2$ = 100 vol % · 10 atm |
| Ex. 54 | 15/25 | $SiF_4$/He = 1/99 vol % · 25° C. · 5 hr | 700° C. · $H_2$ = 100 vol % · 10 atm |
| Ex. 55 | 14/26 | $SiF_4$/He = 1/99 vol % · 25° C. · 30 min | 500° C. · $H_2$ = 100 vol % · 10 atm |
| Ex. 56 | 14/26 | $SiF_4$/He = 1/99 vol % · 25° C. · 10 min | 500° C. · $H_2$ = 100 vol % · 10 atm |
| Ex. 57 | 15/25 | No treatment | 500° C. · $H_2$ = 100 vol % · 10 atm |
| Ex. 58 | 15/25 | $SiF_4$/He = 1/99 vol % · 25° C. · 5 hr | 500° C. · $H_2$ = 100 vol % · 1 atm |
| Ex. 59 | 15/25 | $SiF_4$/He = 1/99 vol % · 25° C. · 5 hr | 500° C. · $H_2$/He = 15/85 vol % · 1 atm |
| Ex. 60 | 15/25 | $SiF_4$/He = 1/99 vol % · 25° C. · 10 hr | No treatment |

EXAMPLES 61 to 65

According to the soot method, fine $SiO_2$ particles formed by subjecting $SiCl_4$ to hydrolysis in an oxyhydrogen flame, were deposited on a substrate to prepare a porous quartz glass body of 400 mm$\phi$×length 600 nm. The porous quartz glass body was installed in an electric furnace capable of controlling the atmosphere, and the temperature was raised under a reduced pressure of at most 1 Torr, and the porous quartz glass body was held at 1,200° C. for a predetermined time, and then the temperature was raised to 1,450° C., and the porous quartz glass body was held at this temperature for 10 hours, to prepare a synthetic quartz glass (200 mmφ× length 450 mm).

The obtained synthetic quartz glass was sliced into 200 mmφ×length 10 mm, and held in a hydrogen-containing atmosphere under conditions as shown in Table 9 for 30 hours, to dope the synthetic quartz glass with hydrogen.

In the above-mentioned production steps, the OH group concentration and the concentration of the oxygen deficient defects in the synthetic quartz glass were controlled by adjusting the holding time at 1,200° C. Further, the hydrogen molecule concentration in the synthetic quartz glass was controlled by adjusting the treatment temperature, the hydrogen concentration and the total pressure in the atmosphere, at the time of carrying out the hydrogen doping. The treatment conditions in the production steps in Examples are shown in Table 9 in detail.

TABLE 9

|  | Vitrification condition (holding time at 1,200° C.) | Hydrogen treatment conditions (treatment temperature, atmosphere, pressure) |
| --- | --- | --- |
| Ex. 61 | 10 hr | 500° C. · $H_2$ = 100 vol % · 10 atm |
| Ex. 62 | 20 hr | 500° C. · $H_2$ = 100 vol % · 10 atm |
| Ex. 63 | 40 hr | 500° C. · $H_2$ = 100 vol % · 10 atm |
| Ex. 64 | Nil | 500° C. · $H_2$ = 100 vol % · 10 atm |
| Ex. 65 | 20 hr | No treatment |

Of the synthetic quartz group obtained in each of Examples 48 to 65, the OH group concentration, the hydrogen molecule concentration, the internal transmittance of 163 nm and the presence or absence of the oxygen deficient defects, were obtained in accordance with the above-mentioned methods. Further, the internal transmittance at 172 nm, the internal transmittance at 157 nm and $\Delta T_{163}$ as an index of the durability to ultraviolet light, were measured, whereupon vacuum ultraviolet lights optical transmittance at a wavelength of at most 175 nm, the vacuum ultraviolet lights optical transmittance at a wavelength of at most 160 nm, and the durability to ultraviolet light, were evaluated. The evaluation results are shown in Table 10 and Table 11. Among Examples 48 to 65, Examples 52 to 54 with the oxygen deficient defects, and Examples 55 to 58 and 64 with a relatively high OH group concentration, have lower internal transmittance then the others.

TABLE 10

|  | OH group conc. (ppm) | Hydrogen molecule conc. [molecules/cm$^3$] | Internal transmittance at 163 nm (%/cm) | Oxygen deficient defects |
| --- | --- | --- | --- | --- |
| Ex. 48 | 4.6 | $1.8 \times 10^{18}$ | 93.7 | Absent |
| Ex. 49 | 2.7 | $1.8 \times 10^{18}$ | 96.0 | Absent |
| Ex. 50 | 5.8 | $1.8 \times 10^{18}$ | 92.3 | Absent |
| Ex. 51 | 5.6 | $1.8 \times 10^{18}$ | 92.5 | Absent |
| Ex. 52 | 4.1 | $1.8 \times 10^{18}$ | 66.5 | Present |
| Ex. 53 | 3.8 | $1.8 \times 10^{18}$ | 15.5 | Present |

TABLE 10-continued

|  | OH group conc. (ppm) | Hydrogen molecule conc. [molecules/cm$^3$] | Internal transmittance at 163 nm (%/cm) | Oxygen deficient defects |
| --- | --- | --- | --- | --- |
| Ex. 54 | 5.8 | $1.4 \times 10^{18}$ | 84.8 | Present |
| Ex. 55 | 13.7 | $1.8 \times 10^{18}$ | 84.8 | Absent |
| Ex. 56 | 23.1 | $1.8 \times 10^{18}$ | 77.4 | Absent |
| Ex. 57 | 143 | $1.8 \times 10^{18}$ | 29.8 | Absent |
| Ex. 58 | 6.6 | $1.7 \times 10^{18}$ | 91.6 | Absent |
| Ex. 59 | 6.5 | $2.1 \times 10^{16}$ | 91.7 | Absent |
| Ex. 60 | 4.5 | Less than $5 \times 10^{16}$ | 93.7 | Absent |
| Ex. 61 | 7.4 | $1.8 \times 10^{18}$ | 90.7 | Absent |
| Ex. 62 | 4.3 | $1.8 \times 10^{18}$ | 94.1 | Absent |
| Ex. 63 | 2.8 | $1.8 \times 10^{18}$ | 95.8 | Absent |
| Ex. 64 | 53 | $1.8 \times 10^{18}$ | 59.4 | Absent |
| Ex. 65 | 4.2 | Less than $5 \times 10^{16}$ | 94.1 | Absent |

TABLE 11

|  | Evaluation 1 Internal transmittance at 172 nm (%/cm) | Evaluation 2 Internal transmittance at 157 nm (%/cm) | Evaluation 3 $\Delta T_{163}$ (%/cm) |
| --- | --- | --- | --- |
| Ex. 48 | 93.7 | 80.5 | ND |
| Ex. 49 | 95.8 | 86.0 | ND |
| Ex. 50 | 92.6 | 77.6 | ND |
| Ex. 51 | 92.8 | 78.1 | ND |
| Ex. 52 | 77.8 | 73.2 | 0.35 |
| Ex. 53 | 48.9 | 20.5 | 0.63 |
| Ex. 54 | 90.4 | 71.3 | 0.10 |
| Ex. 55 | 86.1 | 63.6 | ND |
| Ex. 56 | 80.0 | 52.5 | ND |
| Ex. 57 | 40.5 | 10.9 | ND |
| Ex. 58 | 91.8 | 75.9 | 0.01 |
| Ex. 59 | 91.9 | 76.1 | 0.05 |
| Ex. 60 | 93.8 | 80.8 | 0.05 |
| Ex. 61 | 91.1 | 74.2 | ND |
| Ex. 62 | 94.1 | 81.3 | ND |
| Ex. 63 | 95.7 | 85.7 | ND |
| Ex. 64 | 65.6 | 32.2 | ND |
| Ex. 65 | 94.2 | 81.6 | 0.06 |

Examples 66 to 81 are experimental examples wherein the influences of the fluorine concentration, the OH group concentration, the fictive temperature and the presence or absence of the oxygen deficient defects, on the characteristics of the synthetic quartz glass were studied.

EXAMPLES 66 to 81

According to the known soot method, fine $SiO_2$ particles formed by subjecting $SiCl_4$ as the glass forming material to hydrolysis in an oxyhydrogen flame of from 1,200 to 1,500° C., were deposited on a substrate to prepare a porous quartz glass body of 300 mmφ×length 800 mm. The condition of the oxyhydrogen flame is shown in the step (a) in Table 12. The step (a) in Table 12 represents the volume ratio of oxygen to hydrogen based on $SiCl_4$ as the glass forming material.

The porous quartz glass body was installed in an electric furnace capable of controlling the atmosphere, and dehydration (decrease of the OH groups) of the porous quartz glass body was carried out in an atmosphere at a treatment temperature for a treatment time as shown in the step (b) in Table 11, and at the same time, doping with fluorine was carried out. In the step (b) in Table 12, the atmosphere is represented by vol %. Then, the temperature was raised to 1,450° C. while holding the porous quartz glass body under a reduced pressure of at most 10 Torr, and it was held at this temperature for 10 hours, to prepare a transparent quartz glass body (105 mmφ×length 650 mm).

Further, the obtained temperature quartz glass body was heated to 1,750° C. which was at least the softening point, in an electric furnace having a carbon heating element, in a hydrogen gas 100% atmosphere under normal pressure, for deformation by gravity in a growth axis direction, to mold into a cylindrical block. Then, treatment was carried out at a treatment temperature for a treatment time as shown in the step (d) in Table 12 while leaving the molded block in the electric furnace, and then the temperature of the electric furnace was decreased to room temperature with a temperature-decreasing profile as shown in the step (d) in Table 12, to control the fictive temperature.

In the above-mentioned production steps, the OH group concentration and the fluorine concentration in the synthetic quartz glass to be obtained were controlled by adjusting the flow rate ratio of oxygen gas to hydrogen gas based on the starting material gas at the time of producing the porous quartz glass body, or the atmospheric gas composition and the temperature at the time of holding the porous quartz glass body in an atmosphere containing a fluorine compound. Further, the fictive temperature was controlled by adjusting the temperature at the time of holding the molded cylindrical block at a high temperature, and the temperature-decreasing profile.

Of the synthetic quartz glass obtained in each of Examples, the fluorine concentration, the OH group concentration, the fictive temperature and the presence or absence of the oxygen deficient defects, were measured and shown in Table 13.

Further, the internal transmittance at a wavelength of 157 nm was measured as an index of the transmittance at the vacuum ultraviolet region with a wavelength of at most 200 nm. The evaluation results are shown in Table 14.

Among Examples 66 to 81 in Tables 12 to 14, Examples 66 and 73 with a high OH group concentration, Example 73 with a low fluorine concentration, Example 74 with a high fictive temperature, and Example 81 with the oxygen deficient defects, were inferior to the others in characteristics.

TABLE 12

| | Step (a) Synthesis condition ($O_2$/ $H_2$ volume ratio based on glass forming material) | Step (b) Fluorine treatment conditions (atmosphere, treatment temperature, treatment time) | Step (d) Annealing conditions (treatment temperature, treatment time, temperature-decreasing profile) |
|---|---|---|---|
| Ex. 66 | 14/26 | $SiF_4$/He = 0.5 vol %/99 vol %, room temperature, 3 hr | 1000° C. × 100 hr, temperature decreased at 5° C./hr to 700° C. |
| Ex. 67 | 14/26 | $SiF_4$/He = 1 vol %/99 vol %, room temperature, 15 hr | 1000° C. × 100 hr, temperature decreased at 5° C./hr to 700° C. |
| Ex. 68 | 14/26 | $SiF_4$/He = 1 vol %/99 vol %, room temperature, 20 hr | 1000° C. × 100 hr, temperature decreased at 5° C./hr to 700° C. |
| Ex. 69 | 14/26 | $SiF_4$/He = 1 vol %/99 vol %, 300° C., 10 hr | 1000° C. × 100 hr, temperature decreased at 5° C./hr to 700° C. |
| Ex. 70 | 14/26 | $SiF_4$/He = 1 vol %/99 vol %, 500° C., 10 hr | 1000° C. × 100 hr, temperature decreased at 5° C./hr to 700° C. |
| Ex. 71 | 14/26 | $SiF_4$/He = 1 vol %/99 vol %, 300° C., 10 hr | 1000° C. × 100 hr, temperature decreased at 5° C./hr to 700° C. |
| Ex. 72 | 14/26 | $SiF_4$/He = 1 vol %/99 vol %, 300° C., 10 hr | 1000° C. × 100 hr, temperature decreased at 5° C./hr to 700° C. |
| Ex. 73 | 14/26 | $SiF_4$/He = 1 vol %/99 vol %, 300° C., 10 hr | 1000° C. × 100 hr, temperature decreased at 5° C./hr to 700° C. |
| Ex. 74 | 14/26 | $SiF_4$/He = 1 vol %/99 vol %, 300° C., 10 hr | Nil |
| Ex. 75 | 14/26 | $SiF_4$/He = 1 vol %/99 vol %, 300° C., 10 hr | 1050° C. × 100 hr, temperature decreased at 5° C./hr to 700° C. |
| Ex. 76 | 14/26 | $SiF_4$/He = 1 vol %/99 vol %, 300° C., 10 hr | 900° C. × 100 hr, temperature decreased at 5° C./hr to 700° C. |
| Ex. 77 | 14/26 | $SiF_4$/He = 5 vol %/95 vol %, 500° C., 10 hr | 850° C. × 100 hr, temperature decreased at 5° C./hr to 700° C. |
| Ex. 78 | 15/25 | $SiF_4$/$O_2$/He = 5 vol %/20 vol %/75 vol %, 700° C., 10 hr | 850° C. × 100 hr, temperature decreased at 5° C./hr to 700° C. |
| Ex. 79 | 15/25 | $SiF_4$/$O_2$/He = 5 vol %/50 vol %/45 vol %, 900° C., 10 hr | 800° C. × 200 hr, temperature decreased at 5° C./hr to 700° C. |
| Ex. 80 | 15/25 | $SiF_4$/$O_2$/He = 10 vol %/80 vol %/10 vol %, 900° C., 10 hr | 700° C. × 200 hr |
| Ex. 81 | 14/26 | $SiF_4$/He = 5 vol %/95 vol %, 700° C., 10 hr | 1000° C. × 100 hr, temperature decreased at 5° C./hr to 700° C. |

TABLE 13

|  | OH group conc. (ppm) | Fluorine conc. (ppm) | Fictive temp. [° C.] | Oxygen deficient defects |
|---|---|---|---|---|
| Ex. 66 | 17.1 | 150 | 990 | Absent |
| Ex. 67 | 8.8 | 160 | 990 | Absent |
| Ex. 68 | 6.4 | 190 | 990 | Absent |
| Ex. 69 | 4.7 | 200 | 985 | Absent |
| Ex. 70 | 3.6 | 200 | 965 | Absent |
| Ex. 71 | 1.2 | 200 | 985 | Absent |
| Ex. 72 | 2.5 | 230 | 980 | Absent |
| Ex. 73 | 13.4 | 50 | 1010 | Absent |
| Ex. 74 | 9.8 | 135 | 1140 | Absent |
| Ex. 75 | 2.4 | 230 | 1040 | Absent |
| EX. 76 | 2.1 | 230 | 930 | Absent |
| Ex. 77 | 1.2 | 460 | 860 | Absent |
| Ex. 78 | 1.1 | 820 | 830 | Absent |
| Ex. 79 | 1.1 | 1520 | 780 | Absent |
| Ex. 80 | 1.1 | 2830 | 720 | Absent |
| Ex. 81 | 1.2 | 790 | 990 | Present |

TABLE 14

|  | Internal transmittance at 157 nm (%/cm) |
|---|---|
| Ex. 66 | 59.1 |
| Ex. 67 | 73.9 |
| Ex. 68 | 78.6 |
| Ex. 69 | 82.6 |
| Ex. 70 | 85.6 |
| Ex. 71 | 94.0 |
| Ex. 72 | 89.0 |
| Ex. 73 | 64.3 |
| Ex. 74 | 69.5 |
| Ex. 75 | 86.7 |
| Ex. 76 | 92.1 |
| Ex. 77 | 95.7 |
| Ex. 78 | 96.1 |
| Ex. 79 | 96.6 |
| Ex. 80 | 96.8 |
| Ex. 81 | 63.3 |

EXAMPLES 82 to 85

According to the known direct method, $SiCl_4$ and $SiF_4$ were subjected to hydrolysis and oxidation in an oxyhydrogen flame of from 1,800 to 2,000° C. to directly synthesize a transparent quartz glass of 250 mm$\phi$ on a substrate. The transparent quartz glass was stretched into a stick of 200 mm$\phi$, followed by kneading by horizontal zone melting method (FZ method) for uniformalization. Then, the transparent quartz glass was set in an electric furnace and held at 1,250° C. for a certain time, and gradually cooled with a cooling rate of 1° C./hr to 800° C., and then left to cool, to obtain a synthetic quartz glass.

In the above-mentioned production steps, the fluorine concentration and its distribution were controlled by adjusting the mixing ratio of $SiCl_4$ and $SiF_4$, and the OH group concentration and its distribution and the hydrogen molecule concentration were controlled by adjusting the flow rate ratio of oxygen to hydrogen, to obtain a synthetic quartz glass of each of Examples 82 to 85 as shown in Tables 15 and 16.

EXAMPLES 86 to 94

According to the known soot method, fine $SiO_2$ particles formed by subjecting $SiCl_4$ to hydrolysis in an oxyhydrogen flame of from 1,200 to 1,500° C., were deposited on a substrate to prepare a porous quartz glass body of 300 mm$\phi$×length 80 mm. The porous quartz glass body was installed in an electric furnace capable of controlling the atmosphere, and a helium gas containing 1 vol % of a fluorine compound was introduced thereinto under a reduced pressure of at most 10 Torr. The porous quartz glass body was held in this atmosphere under normal pressure at room temperature for several hours, to carry out dehydration of the porous quartz glass, and at the same time, to carry out doping with fluorine. Then, the temperature was raised to 1,450° C. while holding the porous quartz glass body under a reduced pressure of at most 10 Torr, and it was held at this temperature for 10 hours, to prepare a transparent quartz glass body (105 mm$\phi$×length 650 mm).

Then, the obtained transparent quartz glass body was heated to 1,750° C. which was at least the softening point, in an electric furnace having a carbon heating element, for deformation by gravity in a growth axis direction to mold into a cylindrical block. Then, the temperature of the electric furnace was decreased to 1,250° C. while leaving the molded block in the electric furnace, followed by gradually cooling with a cooling rate of 1° C./hr, and the electric supply was terminated when the temperature in the furnace reached 800° C. The obtained quartz block was sliced to have a thickness of 30 mm, and held in a hydrogen-containing atmosphere at 500° C. for 240 hours to dope the quartz glass with hydrogen, to obtain a synthetic quartz glass of each of Examples 82 to 94 in Tables 14 to 19.

In the above-mentioned production steps, the OH group concentration and the fluorine concentration in the synthetic quartz glass to be obtained were controlled by adjusting the flow rate ratio of oxygen gas to hydrogen gas based on the material gas at the time of producing the porous quartz glass body, or the concentration of the fluorine compound and the holding time at the time of holding the porous quartz glass body in an atmosphere containing the fluorine compound. Further, the variation ranges of the OH group concentration and the fluorine concentration in the synthetic quartz glass were controlled by adjusting the size at the time of molding. Further, the hydrogen molecule concentration in the synthetic quartz glass was controlled by adjusting conditions for heat treatment in the hydrogen-containing atmosphere.

Of the synthetic quartz glass obtained in each of Examples 82 to 94, the fluorine concentration and its variation range, the OH group concentration and its variation range, the chlorine concentration and the hydrogen molecule concentration were measured.

Then, with respect to a sample prepared from the synthetic quartz glass of each of Examples 82 to 94, the refractive index distribution, $L_{650}/S_{248}$, and the internal transmittance at 157 nm, were measured and evaluated.

The evaluation results are shown in Table 15 to 21. Examples 82 to 84, 87 to 91 and 84 are Working Examples of the present invention, and the others are Comparative Examples.

TABLE 15

| | Process | F conc. (ppm) | OH group conc. (ppm) | Chlorine conc. (ppm) | Refractive index variation range |
|---|---|---|---|---|---|
| Ex. 82 | Direct method | Max. = 900<br>Min. = 885<br>Variation range = 15 | Max. = 950<br>Min. = 935<br>Variation range = 15 | Max. = 23<br>Min. = 14<br>Variation range = 9 | 6.6 ppm |
| | | 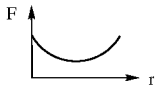 |  |  |  |
| Ex. 83 | Direct method | Max. = 895<br>Min. = 890<br>Variation range = 5 | Max. = 945<br>Min. = 940<br>Variation range = 5 | Max. = 23<br>Min. = 18<br>Variation range = 5 | 2.0 ppm |
| | | 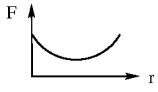 |  |  | 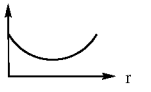 |
| Ex. 84 | Direct method | Max. = 893<br>Min. = 891<br>Variation range = 2 | Max. = 943<br>Min. = 941<br>Variation range = 2 | Max. = 23<br>Min. = 20<br>Variation range = 3 | 0.7 ppm |
| | | 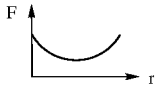 |  |  | 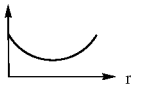 |

TABLE 16

| | Process | F conc. (ppm) | OH group conc. (ppm) | Chlorine conc. (ppm) | Refractive index variation range |
|---|---|---|---|---|---|
| Ex. 85 | Direct method | Max. = 940<br>Min. = 910<br>Variation range = 30 | Max. = 960<br>Min. = 930<br>Variation range = 30 | Max. = 21<br>Min. = 14<br>Variation range = 7 | 14.3 ppm |
| | | 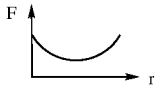 |  | 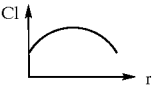 | 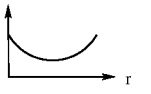 |
| Ex. 86 | Direct method | Max. = 936<br>Min. = 914<br>Variation range = 22 | Max. = 956<br>Min. = 934<br>Variation range = 22 | Max. = 68<br>Min. = 53<br>Variation range = 15 | 9.5 ppm |
| | | 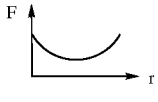 |  | 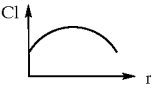 | 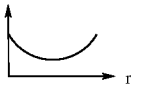 |
| Ex. 87 | Soot method | Max. = 606<br>Min. = 583<br>Variation range = 23 | Max. = 40<br>Min. = 18<br>Variation range = 22 | Max. = 10<br>Min. = 7<br>Variation range = 3 | 6.7 ppm |
| | | 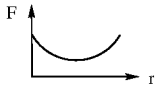 | 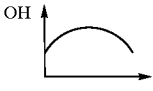 | 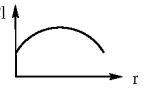 | 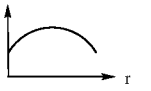 |

TABLE 17

| | Process | F conc. (ppm) | OH group conc. (ppm) | Chlorine conc. (ppm) | Refractive index variation range |
|---|---|---|---|---|---|
| Ex. 88 | Soot method | Max. = 598<br>Min. = 596<br>Variation range = 2 | Max. = 28<br>Min. = 26<br>Variation range = 2 | Max. = 8<br>Min. = 8<br>Variation range = 0 | 0.6 ppm |

TABLE 17-continued

| | Process | F conc. (ppm) | OH group conc. (ppm) | Chlorine conc. (ppm) | Refractive index variation range |
|---|---|---|---|---|---|
| | |  | 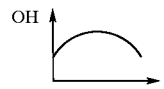 | 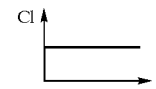 | 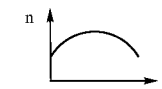 |
| Ex. 89 | Soot method | Max. = 617<br>Min. = 615<br>Variation range = 2 | Max. = 24<br>Min. = 23<br>Variation range = 1 | Max. = 8<br>Min. = 8<br>Variation range = 0 | 0.7 ppm |
| | |  | 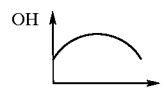 | 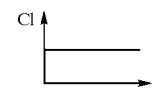 | 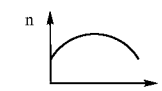 |
| Ex. 90 | Soot method | Max. = 639<br>Min. = 637<br>Variation range = 2 | Max. = 10.5<br>Min. = 10.1<br>Variation range = 0.4 | Max. = 8<br>Min. = 8<br>Variation range = 0 | 0.8 ppm |
| | |  | 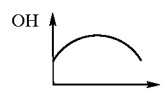 |  | 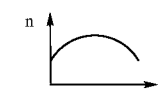 |

TABLE 18

| | Process | F conc. (ppm) | OH group conc. (ppm) | Chlorine conc. (ppm) | Refractive index variation range |
|---|---|---|---|---|---|
| Ex. 91 | Soot method | Max. = 715<br>Min. = 713<br>Variation range = 2 | Max. = 5.6<br>Min. = 5.5<br>Variation range = 0.1 | Max. = 8<br>Min. = 8<br>Variation range = 0 | 0.8 ppm |
| | |  |  | 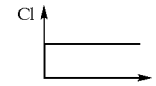 |  |
| Ex. 92 | Soot method | Max. = 557<br>Min. = 515<br>Variation range = 42 | Max. = 75<br>Min. = 20<br>Variation range = 55 | Max. = 10<br>Min. = 6<br>Variation range = 4 | 10.9 ppm |
| | |  | 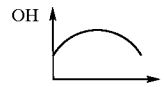 |  |  |
| Ex. 93 | Soot method | Max. = 634<br>Min. = 592<br>Variation range = 42 | Max. = 59<br>Min. = 31<br>Variation range = 28 | Max. = 10<br>Min. = 6<br>Variation range = 4 | 13.6 ppm |
| | |  | 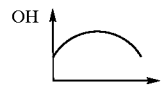 |  |  |

TABLE 19

| | Process | F conc. (ppm) | OH group conc. (ppm) | Chlorine conc. (ppm) | Refractive index variation range |
|---|---|---|---|---|---|
| Ex. 94 | Soot method | Max. = 730<br>Min. = 728<br>Variation range = 2 | Max. = 3.7<br>Min. = 3.6<br>Variation range = 0.1 | Max. = 8<br>Min. = 8<br>Variation range = 0 | 0.8 ppm |

TABLE 19-continued

| Process | F conc. (ppm) | OH group conc. (ppm) | Chlorine conc. (ppm) | Refractive index variation range |
|---|---|---|---|---|
| F (curve decreasing then increasing vs r) | OH (curve rising then falling vs r) | Cl (flat vs r) | n (curve rising then falling vs r) | |

TABLE 20

| | Hydrogen molecule conc. [molecules/cm³] | $\Delta K_{214}$ [cm$^{-1}$] Max. | $\Delta K_{214}$ [cm$^{-1}$] Min. | $L_{650}/S_{248}$ [-] Max. | $L_{650}/S_{248}$ [-] Min. |
|---|---|---|---|---|---|
| Ex. 84 | $3.1 \times 10^{18}$ | $8.8 \times 10^{-3}$ | $8.6 \times 10^{-3}$ | $36.3 \times 10^{-5}$ | $36.0 \times 10^{-5}$ |
| Ex. 85 | $3.1 \times 10^{18}$ | $9.1 \times 10^{-3}$ | $8.8 \times 10^{-3}$ | $36.2 \times 10^{-5}$ | $36.1 \times 10^{-5}$ |
| Ex. 86 | $3.1 \times 10^{18}$ | $9.1 \times 10^{-3}$ | $8.7 \times 10^{-3}$ | $36.2 \times 10^{-5}$ | $36.1 \times 10^{-5}$ |
| Ex. 87 | $3.1 \times 10^{18}$ | $8.8 \times 10^{-3}$ | $8.4 \times 10^{-3}$ | $36.5 \times 10^{-5}$ | $35.9 \times 10^{-5}$ |
| Ex. 88 | $1.8 \times 10^{18}$ | $1.6 \times 10^{-2}$ | $1.6 \times 10^{-2}$ | $36.4 \times 10^{-5}$ | $35.9 \times 10^{-5}$ |
| Ex. 89 | $1.8 \times 10^{18}$ | $6.1 \times 10^{-3}$ | $6.1 \times 10^{-3}$ | $6.0 \times 10^{-5}$ | $3.5 \times 10^{-5}$ |
| Ex. 90 | $1.8 \times 10^{18}$ | $6.1 \times 10^{-3}$ | $6.1 \times 10^{-3}$ | $4.1 \times 10^{-5}$ | $4.0 \times 10^{-5}$ |
| Ex. 91 | $1.8 \times 10^{18}$ | $6.1 \times 10^{-3}$ | $6.1 \times 10^{-3}$ | $2.5 \times 10^{-5}$ | $2.4 \times 10^{-5}$ |
| Ex. 92 | $1.8 \times 10^{18}$ | $6.1 \times 10^{-3}$ | $6.1 \times 10^{-3}$ | $1.7 \times 10^{-5}$ | $1.7 \times 10^{-5}$ |
| Ex. 93 | $1.8 \times 10^{18}$ | $5.9 \times 10^{-3}$ | $5.9 \times 10^{-3}$ | $8.1 \times 10^{-5}$ | $3.7 \times 10^{-5}$ |
| Ex. 94 | $1.8 \times 10^{18}$ | $6.2 \times 10^{-3}$ | $6.2 \times 10^{-3}$ | $7.0 \times 10^{-5}$ | $4.8 \times 10^{-5}$ |
| Ex. 95 | $1.7 \times 10^{17}$ | $6.1 \times 10^{-3}$ | $6.1 \times 10^{-3}$ | $11.0 \times 10^{-5}$ | $10.9 \times 10^{-5}$ |
| Ex. 96 | $1.8 \times 10^{16}$ | $5.9 \times 10^{-3}$ | $5.9 \times 10^{-3}$ | $21.3 \times 10^{-5}$ | $21.2 \times 10^{-5}$ |

TABLE 21

| | Internal transmittance at 157 nm (%/cm) Max. | Internal transmittance at 157 nm (%/cm) Min. |
|---|---|---|
| Ex. 84 | <0.1 | <0.1 |
| Ex. 85 | <0.1 | <0.1 |
| Ex. 86 | <0.1 | <0.1 |
| Ex. 87 | <0.1 | <0.1 |
| Ex. 88 | <0.1 | <0.1 |
| Ex. 89 | 58.0 | 39.2 |
| Ex. 90 | 49.7 | 48.0 |
| Ex. 91 | 52.6 | 51.6 |
| Ex. 92 | 69.2 | 68.5 |
| Ex. 93 | 78.3 | 78.1 |
| Ex. 94 | 55.7 | 23.9 |
| Ex. 95 | 45.5 | 29.6 |
| Ex. 96 | 83.8 | 83.3 |

INDUSTRIAL APPLICABILITY

According to the present invention, a synthetic quartz glass which has excellent ultraviolet lights optical transmittance, which can reduce fluorescence emission or decrease in transmittance based on generation of E' center due to irradiation with radiation or high energy light from a light source such as an excimer laser, and which is excellent in durability to ultraviolet light, can be obtained.

Further, according to the present invention, a synthetic quartz glass which is excellent in vacuum ultraviolet lights optical transmittance, can be obtained. Particularly, a synthetic quartz glass having a high transmittance even at the vacuum ultraviolet region with a wavelength of at most 200 nm, can be obtained.

Further, according to the present invention, a synthetic quartz glass which is excellent in uniformity and durability to ultraviolet light, can be obtained.

Accordingly, the synthetic quartz glass of the present invention is extremely suitable for parts constituting an optical system to be used for light within a range of from the ultraviolet region to the vacuum ultraviolet region.

Further, according to the present invention, a synthetic quartz glass which is excellent in the above-mentioned durability to ultraviolet light, vacuum ultraviolet lights optical transmittance or uniformity. can readily be produced.

What is claimed is:

1. A synthetic quartz glass for optical use, to be used by irradiation with light within a range of from the ultraviolet region to the vacuum ultraviolet region, which contains fluorine, which has a ratio $I_{2250}/I_{800}$ of the scattering peak intensity of 2,250 cm$^{-1}$ ($I_{2250}$) to the scattering peak intensity 800 cm$^{-1}$ ($I_{800}$) of at most $1 \times 10^{-4}$ in the laser Raman spectrum, and which has an absorption coefficient of light of 245 nm of at most $2 \times 10^{-3}$ cm$^{-1}$.

2. The synthetic quartz glass according to claim 1, which has a fluorine concentration of at least 100 ppm.

3. The synthetic quartz glass according to claim 1, which has an OH group concentration of at most 100 ppm.

4. The synthetic quartz glass according to claim 1, which has a chlorine concentration of at most 100 ppm.

5. The synthetic quartz glass according to claim 1, which has ratios $I_{495}/I_{440}$ and $I_{606}/I_{440}$ of the scattering peak intensity of 495 cm$^{-1}$ ($I_{495}$) and the scattering peak intensity of 606 cm$^{-1}$ ($I_{606}$) to the scattering peak intensity of 440 cm$^{-1}$ ($I_{440}$) of at most 0.585 and at most 0.136, respectively, in the laser Raman spectrum.

6. The synthetic quartz glass according to claim 1, which has an OH group concentration of at most 50 ppm.

7. The synthetic quartz glass according to claim 1, which has an OH group concentration of at most 10 ppm.

8. The synthetic quartz glass according to claim 1, for optical components, to be used at a wavelength range of at most 160 nm, which has an OH group concentration of at most 5 ppm.

9. The synthetic quartz glass according to claim 1, which has a fictive temperature of at most 1,100° C.

10. The synthetic quartz glass according to claim 8, which has an internal transmittance of at least 80%/cm at a wavelength of 157 nm.

11. The synthetic quartz glass according to claim 1, wherein the internal transmittance $T_{163}$ at a wavelength of 163 nm satisfies the following formula (i):

$$T_{163}(\%/cm) \geq \exp(-0.02 C_{OH}^{0.85}) \times 100 \quad \text{(i)}$$

wherein $C_{OH}$ is the OH group concentration (ppm).

12. The synthetic quartz glass according to claim 11, which has a fluorine concentration of at least 100 ppm.

13. The synthetic quartz glass according to claim 11, which has an OH group concentration of at most 100 ppm.

14. The synthetic quartz glass according to claim 11, which has a chlorine concentration of at most 100 ppm.

15. The synthetic quartz glass according to claim 11, which has a fluorine concentration of at least 100 ppm, which has an OH group concentration of at most 100 ppm, and which has a chlorine concentration of at most 100 ppm.

16. The synthetic quartz glass according to claim 11, which has ratios $I_{495}/I_{440}$ and $I_{606}/I_{440}$ of the scattering peak intensity of 495 cm$^{-1}$ ($I_{495}$) and the scattering peak intensity of 606 cm$^{-1}$ ($I_{606}$) to the scattering peak intensity of 440 cm$^{-1}$ ($I_{440}$) of at most 0.585 and at most 0.136, respectively, in the laser Raman spectrum.

17. The synthetic quartz glass according to claim 11, which has an OH group concentration of at most 50 ppm.

18. The synthetic quartz glass according to claim 11, which has an OH group concentration of at most 10 ppm.

19. The synthetic quartz glass according to claim 11, for optical components, to be used at a wavelength range of at most 160 nm, which has an OH group concentration of at most 5 ppm.

20. The synthetic quartz glass according to claim 11, which has a fictive temperature of at most 1,100° C.

* * * * *